(12) United States Patent
Nishikawa

(10) Patent No.: US 11,943,403 B2
(45) Date of Patent: Mar. 26, 2024

(54) PRINTING APPARATUS HAVING PROCESSING UNIT ATTACHED HAVING IDENTIFICATION SECTION FOR IDENTIFYING THE ATTACHED PROCESSING UNIT

(71) Applicant: BROTHER KOGYO KABUSHIKI KAISHA, Nagoya (JP)

(72) Inventor: Yasuo Nishikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/315,061

(22) Filed: May 10, 2023

(65) Prior Publication Data
US 2023/0388429 A1    Nov. 30, 2023

(30) Foreign Application Priority Data

May 31, 2022   (JP) ................................. 2022-088389

(51) Int. Cl.
*G06F 3/12*      (2006.01)
*H04N 1/00*      (2006.01)

(52) U.S. Cl.
CPC ..... *H04N 1/00538* (2013.01); *H04N 1/00424* (2013.01); *H04N 1/00615* (2013.01); *H04N 1/00676* (2013.01)

(58) Field of Classification Search
None
See application file for complete search history.

(56) References Cited

U.S. PATENT DOCUMENTS

| 2008/0038023 A1* | 2/2008 | Eto ..................... G03G 15/0877 399/258 |
| 2012/0253503 A1* | 10/2012 | Nakamura ............... B26D 5/30 700/160 |
| 2021/0122174 A1* | 4/2021 | Tanaka ................... B41J 2/1752 |

FOREIGN PATENT DOCUMENTS

JP    2015-009512 A    1/2015

* cited by examiner

*Primary Examiner* — Dung D Tran
(74) *Attorney, Agent, or Firm* — KENEALY VAIDYA LLP

(57) ABSTRACT

A printing apparatus includes a conveyor, a print engine, and a processing device. The conveyor is configured to convey a print medium in a conveyance direction. The print engine includes a print head, and a platen configured to support the print medium conveyed by the conveyor. The print engine is configured to perform image printing on the print medium supported by the platen while moving the print head in a first direction intersecting the conveyance direction. The processing device has a processing unit removably attached thereto. The processing device is configured to perform a processing process to divide the print medium conveyed by the conveyor into a plurality of media. The processing unit has an identification section for identifying a type of the processing process executable by the processing unit.

26 Claims, 16 Drawing Sheets

PRINTING APPARATUS HAVING PROCESSING UNIT ATTACHED HAVING IDENTIFICATION SECTION FOR IDENTIFYING THE ATTACHED PROCESSING UNIT

REFERENCE TO RELATED APPLICATIONS

This application claims priority from Japanese Patent Application No. 2022-088389 filed on May 31, 2022. The entire content of the priority application is incorporated herein by reference.

BACKGROUND ART

A printing apparatus having a cutter configured to cut a sheet has been known. The cutter is removably attached to a main body housing of the printing apparatus. A user may remove the cutter that is due for replacement from the main body housing and attach a new cutter to the main body housing.

DESCRIPTION

In the meantime, there are other processing methods (e.g., perforating and creasing) for dividing a print medium into a plurality of media, in addition to cutting the print medium with the cutter as in the above known technology. A blade usable for the processing varies depending on the type of processing method.

When a user is allowed to select any one of a plurality of processing methods implementable in a printing apparatus, the user needs to replace a currently-attached processing unit with another processing unit having a blade suitable for the selected processing method. However, if all the replaceable processing units have the same design, it may be difficult for the user to identify which processing method is implementable by each individual processing unit.

Aspects of the present disclosure are advantageous for providing one or more improved techniques for a printing apparatus that make it possible to easily identify a type of processing process executable by a processing unit.

According to aspects of the present disclosure, a printing apparatus is provided, which includes a conveyor, a print engine, and a processing device. The conveyor is configured to convey a print medium in a conveyance direction. The print engine includes a print head and a platen. The platen is configured to support the print medium conveyed by the conveyor. The print engine is configured to perform image printing on the print medium supported by the platen while moving the print head in a first direction intersecting the conveyance direction. The processing device has a processing unit removably attached thereto. The processing device is configured to perform a processing process to divide the print medium conveyed by the conveyor into a plurality of media. The processing unit has an identification section for identifying a type of the processing process executable by the processing unit.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Hereinafter, a printing apparatus 1 in a first illustrative embodiment according to aspects of the present disclosure will be described below with reference to FIGS. 1 to 13.

[Overview of Printing Apparatus]

Figure 1:
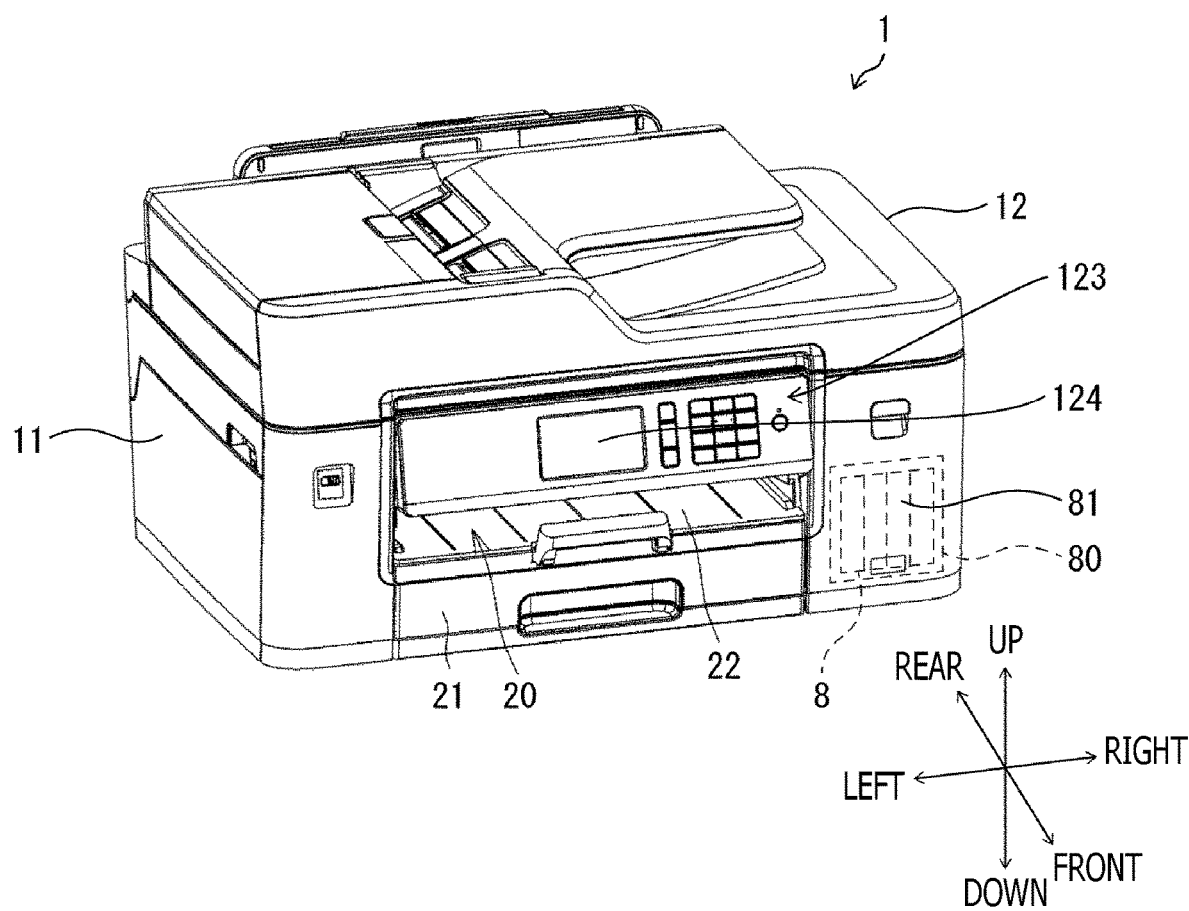
FIG. 1 is a perspective view showing an external appearance of a printing apparatus.

An overview of the printing apparatus 1 will be described with reference to FIG. 1. FIG. 1 is a perspective view showing an appearance of the printing apparatus 1 of the first illustrative embodiment. The printing apparatus 1 shown in FIG. 1 is an MFP ("MFP" is an abbreviation for "Multi-Function Peripheral") having an inkjet printing function for performing printing based on print data specified by a print job on a sheet P, and a scanning function for reading an image formed on the sheet P. Examples of the printing methods applicable to the printing apparatus 1 are not limited to the inkjet printing method, but may include an electrophotographic printing method. The printing apparatus 1 may be configured to perform color printing or may be dedicated to monochrome printing.

In the following description, for the sake of explanatory convenience, a vertical direction, a left-to-right direction, and a front-to-rear direction of the printing apparatus 1 are defined as indicated by arrows in FIG. 1, based on a posture of the printing apparatus 1 installed ready for use on a horizontal surface. Specifically, a frontward direction of the printing apparatus 1 is a discharge direction in which the sheet P is discharged. A rearward direction of the printing apparatus 1 is opposite to the discharge direction for the sheet P.

As shown in FIG. 1, the printing apparatus 1 includes a main body housing 11, and a scanner housing 12 stacked on and above the main body housing 11. The scanner housing 12 has an image scanner configured to read an image formed on the sheet P.

An opening 20 is formed in a front surface of the main body housing 11. The printing apparatus 1 further includes a feed tray 21 and a discharge tray 22 disposed in the opening 20 to be movable along the front-to-rear direction. The feed tray 21 is a case configured to accommodate a plurality of sheets P. An upper side of the feed tray 21 is open. The discharge tray 22 is disposed above the feed tray 21. The discharge tray 22 is configured to support a sheet P, a first sheet P1, and a second sheet P2 that have images printed thereon. For instance, the sheet P is an A4-size sheet. It is noted that examples of the sheet P are not limited to paper media, but may include other resin media such as a transparency or an OHP sheet.

A setting OF ("I/F" is an abbreviation for "interface") 123 is provided on a front face of the main body housing 11. The setting OF 123 has various operable buttons and a display 124. By operating the setting OF 123, the user is allowed to configure various settings related to operations of the printing apparatus 1. The information set via the setting OF 123 is sent to a controller 100.

A cartridge cover 81 is rotatably disposed at a right portion of the front face of the main body housing 11. Inside the cartridge cover 81, ink cartridges 8 attached in a cartridge case 80 are disposed.

[Internal Configuration of Printing Apparatus]

Figure 2:
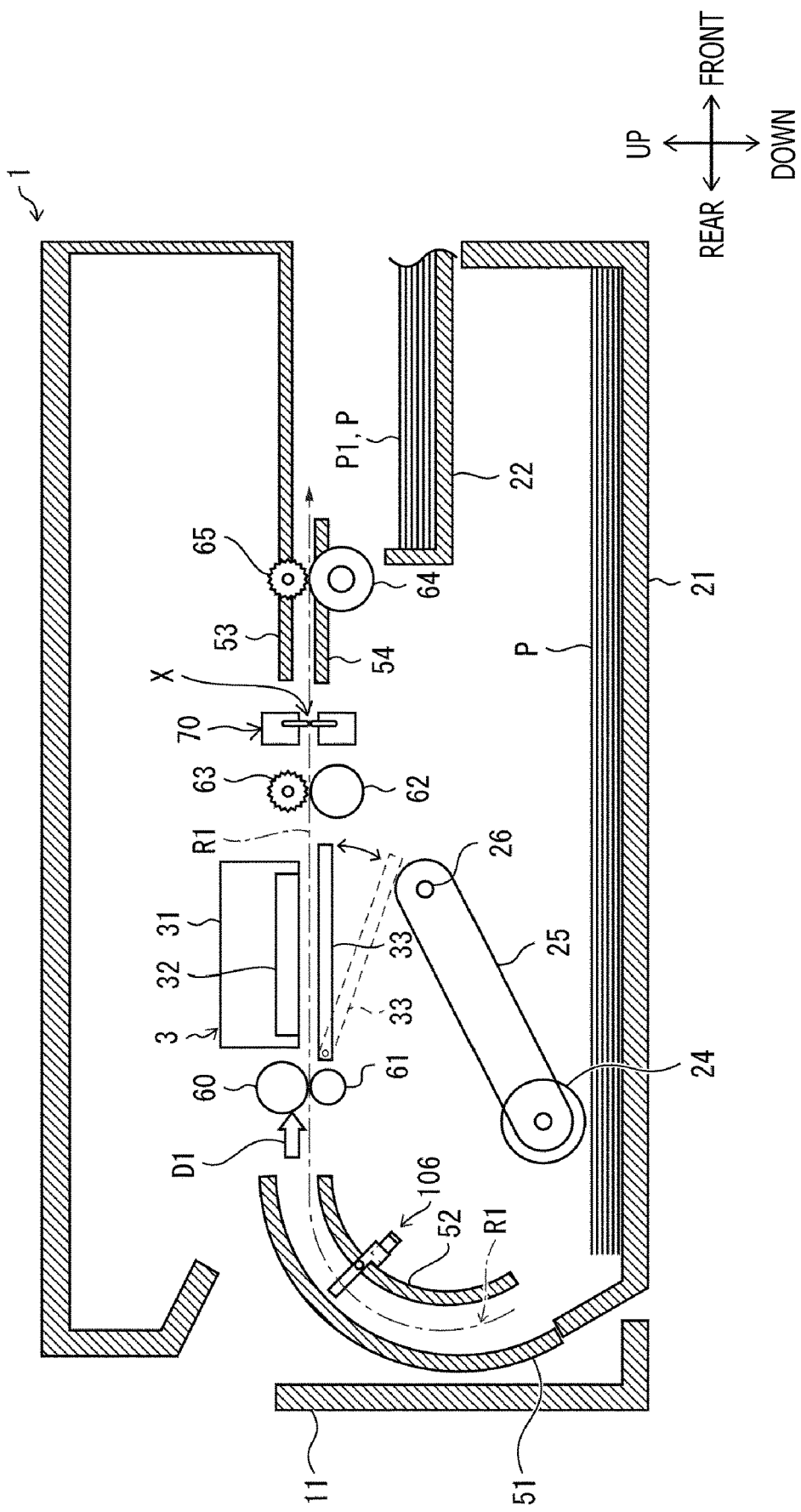
FIG. 2 is a cross-sectional side view showing an internal configuration of the printing apparatus.

With reference to FIG. 2, an internal configuration of the printing apparatus 1 is described. FIG. 2 is a cross-sectional side view showing the internal configuration of the printing apparatus 1. As shown in FIG. 2, the printing apparatus 1 includes a pick-up roller 24, a first conveyance path R1, conveyance rollers 60, 62, and 64, a print engine 3, a conveyance roller 64, and a processing device 70. It is noted that the conveyance rollers 60, 62, and 64 may be included in examples of a "conveyor" according to aspects of the present disclosure. The conveyance rollers 60, 62, and 64 may be collectively or individually referred to as a "conveyor."

The pick-up roller 24 is configured to feed sheets P stored in the feed tray 21 to the first conveyance path R1. The pick-up roller 24 is rotatably supported by a distal end portion of a pick-up arm 25. The pick-up arm 25 is rotatably supported by a shaft 26 supported by a frame of the printing apparatus 1. The pick-up arm 25 is rotated and urged toward the feed tray 21 by its own weight or by an elastic force from a spring or the like.

Figure 3:
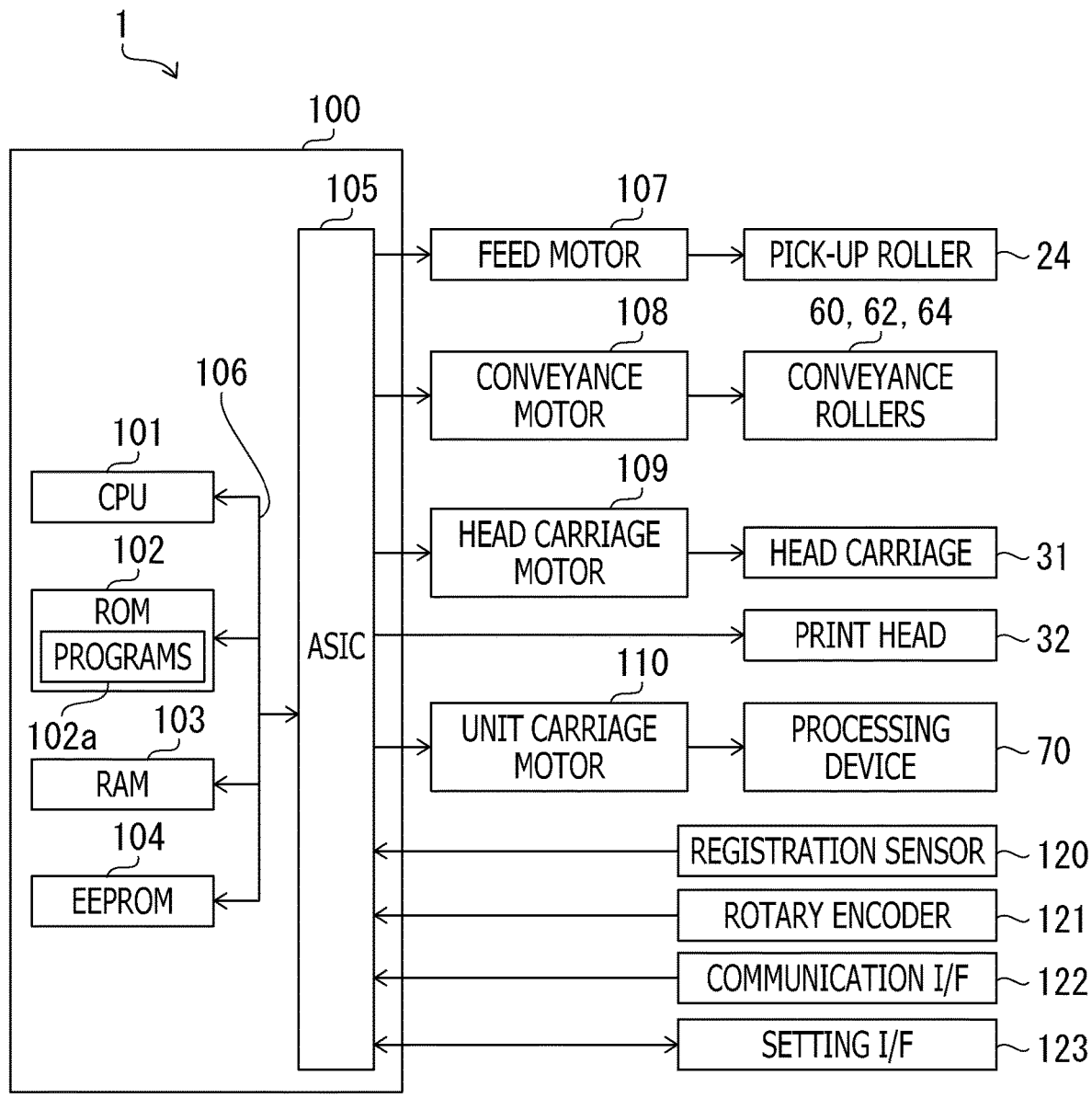
FIG. 3 is a block diagram showing an electrical configuration of the printing apparatus.

The pick-up roller 24 is driven to rotate in a forward rotational direction by a feed motor 107 (see FIG. 3). As the pick-up roller 24 rotates in the forward rotational direction, the sheets P stored in the feed tray 21 are fed in a sheet-by-sheet basis to the first conveyance path R1. The sheet P fed to the first conveyance path R1 is conveyed in a conveyance direction D1 (i.e., a direction from the rear toward the front of the printing apparatus 1).

The first conveyance path R1 is a space formed by guide members 51, 52, 53, and 54, and the print engine 3. The first conveyance path R1 extends upward from a rear end portion of the feed tray 21, curves in a region defined by the guide members 51 and 52, passes through a location of the print engine 3, and extends linearly in a region defined by the guide members 53 and 54 to reach the discharge tray 22.

The conveyance roller 60 is disposed upstream of the print engine 3 in the conveyance direction D1 along the first conveyance path R1. A pinch roller 61 is disposed in a position to face a lower portion of the conveyance roller 60. The conveyance roller 60 is driven to rotate by a conveyance motor 108 (see FIG. 3). The pinch roller 61 is configured to rotate with the rotation of the conveyance roller 60. As the conveyance roller 60 and the pinch roller 61 rotate in the forward rotational direction, the sheet P is conveyed to the print engine 3 while being pinched between the conveyance roller 60 and the pinch roller 61.

The print engine 3 is disposed between the conveyance roller 60 and the conveyance roller 62 along the first conveyance path R1. The print engine 3 has a head carriage 31, a print head 32, and a platen 33. The print head 32 is mounted on the head carriage 31. A plurality of nozzles (not shown) are provided in a lower surface of the print head 32. The print head 32 is configured to vibrate vibrating elements such as piezoelectric elements, thereby ejecting ink droplets from the nozzles. The platen 33 is a rectangular plate-shaped member configured to support a sheet P placed thereon. The print engine 3 is configured to print an image on the sheet P by the print head 32 selectively ejecting ink droplets from nozzles while the head carriage 31 is moving relative to the sheet P supported by the platen 33.

The platen 33 is disposed to be rotatable between a first position (see a solid line in FIG. 2) where the platen 33 is parallel to the first conveyance path R1, and a second position (see a dashed line in FIG. 2) where the platen 33 is rotated downward by a particular angle from the first position. The platen 33 is in the first position when the sheet P is being conveyed and when printing is being performed. On the other hand, when an error such as a paper jam has occurred, the user may put the platen 33 in the second position to remove the jammed sheet P.

The head carriage 31 is configured to reciprocate along a first direction in response to receipt of a driving force from the head carriage motor 109 (see FIG. 3). In the first illustrative embodiment, the first direction is a direction orthogonal to the conveyance direction D1. Namely, the processing device 70 reciprocates along a width direction of the sheet P. In other words, the processing device 70 reciprocates along the left-to-right direction of the printing apparatus 1. It is noted that the first direction may not necessarily be a direction orthogonal to the conveyance direction D1, but has only to be a direction intersecting the conveyance direction D1. In printing an image on the sheet P, the controller 100 of the printing apparatus 1 repeatedly performs a printing process and a line feed process. The printing process is a process to cause the print head 32 to eject ink from nozzles while moving the head carriage 31 in the first direction in a state where the conveyance of the sheet P is stopped, thereby printing a single line of image on the sheet P. The line feed process is a process to drive the conveyance roller 60 and the conveyance roller 62 to convey the sheet P by a particular line feed amount.

The conveyance roller 62 is disposed downstream of the print engine 3 in the conveyance direction D1 along the first conveyance path R1. A spur roller 63 is disposed in a position to face an upper portion of the conveyance roller 62. The conveyance roller 62 is driven by the conveyance motor 108 (see FIG. 3). The spur roller 63 is configured to rotate with the rotation of the conveyance roller 62. As the conveyance roller 62 and the spur roller 63 rotate in the forward rotational direction, the sheet P is conveyed to the processing device 70 while being pinched between the conveyance roller 62 and the spur roller 63.

The processing device 70 is disposed between the conveyance rollers 62 and 64 in the conveyance direction D1 along the first conveyance path R1. The processing device 70 is configured to perform processing (hereinafter, which may be referred to as a "processing process") to divide the conveyed sheet P into a plurality of sheets. In the first illustrative embodiment, a case in which the sheet P is divided into a first sheet P1 and a second sheet P2 by the processing device 70 will be described. The processing device 70 will be described in detail later.

The conveyance roller 64 is disposed downstream of the processing device 70 in the conveyance direction D1 along the first conveyance path R1. A spur roller 65 is disposed in a position to face an upper portion of the conveyance roller 64. The conveyance roller 64 is driven by the conveyance motor 108 (see FIG. 3). The spur roller 65 is configured to rotate with the rotation of the conveyance roller 64. When the conveyance roller 64 and the spur roller 65 rotate in the forward rotational direction, the sheet P or the first sheet P1 is discharged onto the discharge tray 22 while being pinched between the conveyance roller 64 and the spur roller 65. As shown in FIG. 1, the discharge tray 22 is disposed above the feed tray 21. The discharge tray 22 is configured to receive and support the sheet P, the first sheet P1, and the second sheet P2 discharged by the conveyance roller 64.

A registration sensor 120 is disposed upstream of the conveyance roller 60 in the conveyance direction D1 along the first conveyance path R1. The registration sensor 120 is attached to the guide member 52. The registration sensor 120 is configured to detect that a leading end or a trailing end of the sheet P has passed a contact position where the sheet P is in contact with the conveyance roller 60. Examples of sensors usable as the registration sensor 120 may include, but are not limited to, a sensor having an actuator configured to swing when the sheet P comes into contact with the actuator, and an optical sensor.

[Electrical Configuration of Printing Apparatus]

With reference to FIG. 3, an electrical configuration of the printing apparatus 1 will be described. FIG. 3 is a block diagram showing an electrical configuration of the printing apparatus 1. As shown in FIG. 3, the printing apparatus 1 includes the controller 100 and a communication OF 122, in addition to the aforementioned elements.

The controller 100 includes a CPU ("CPU" is an abbreviation for "Central Processing Unit") 101, a ROM ("ROM" is an abbreviation for "Read Only Memory") 102, a RAM ("RAM" is an abbreviation for "Random Access Memory") 103, an EEPROM ("EEPROM" is a registered trademark of UNO S.L.) 104, and ASIC 105, which are interconnected via an internal bus 106. The ROM 102 stores programs 102a configured to, when executed by the CPU 101, cause the controller 100 to control various operations. The RAM 103 is used as a storage area for temporarily storing signals and data used by the CPU 101 to execute the programs 102a, or as a work area for data processing. The EEPROM 104 stores setting information to be retained even after the printing apparatus 1 is powered off. The controller 100 controls each of the elements included in the printing apparatus 1, such as the feed motor 107, the conveyance motor 108, the print head 32, the head carriage motor 109, and a unit carriage motor 110, based on control programs read out from the ROM 102. In the following description, processes and operations by the controller 100 may be achieved by the CPU 101 executing the programs 102a (including the above control programs) stored in the ROM 102.

The ASIC 105 is connected with the feed motor 107, the conveyance motor 108, the head carriage motor 109, the print head 32, the unit carriage motor 110, the registration sensor 120, a rotary encoder 121, the communication OF 122, and the setting OF 123.

The ASIC 105 supplies drive current to the feed motor 107, the conveyance motor 108, the head carriage motor 109, and the unit carriage motor 110. The feed motor 107, the conveyance motor 108, the head carriage motor 109, and the unit carriage motor 110 are DC motors each of which is configured to increase its rotational speed as the supplied drive current increases and to decrease its rotational speed as the supplied drive current decreases. The controller 100 controls the respective rotations of the feed motor 107, the conveyance motor 108, the head carriage motor 109, and the unit carriage motor 110, for instance, by PWM ("PWM" is an abbreviation for "Pulse Width Modulation") control. Further, the controller 100 applies drive voltage to the vibrating elements of the print head 32, thereby ejecting ink droplets from the nozzles.

The rotary encoder 121 is provided to the conveyance roller 60. The rotary encoder 121 is configured to detect the rotation of the conveyance roller 60. More specifically, the rotary encoder 121 is configured to output a pulse signal to the controller 100 in response to the rotation of the conveyance roller 60. The controller 100 detects a rotational amount of the conveyance roller 60 based on the pulse signal output from the rotary encoder 121. The controller 100 detects that the sheet P has passed the contact position where the sheet P is in contact with the conveyance roller 60 based on the detection signal output from the registration sensor 120. Then, the controller 100 estimates a conveyance amount of the sheet P conveyed along the first conveyance path R1 based on the pulse signal output from the rotary encoder 121 after an ON signal is output from the registration sensor 120.

The communication OF 122 is connected with a network such as a LAN. The communication OF 122 is configured to connect the printing apparatus 1 with an external device in which a driver for the printing apparatus 1 is incorporated. The printing apparatus 1 may receive, via the communication OF 122, a print job that contains identification information for identifying a type of the sheet P.

[Configuration of Processing Device]

Figure 4:
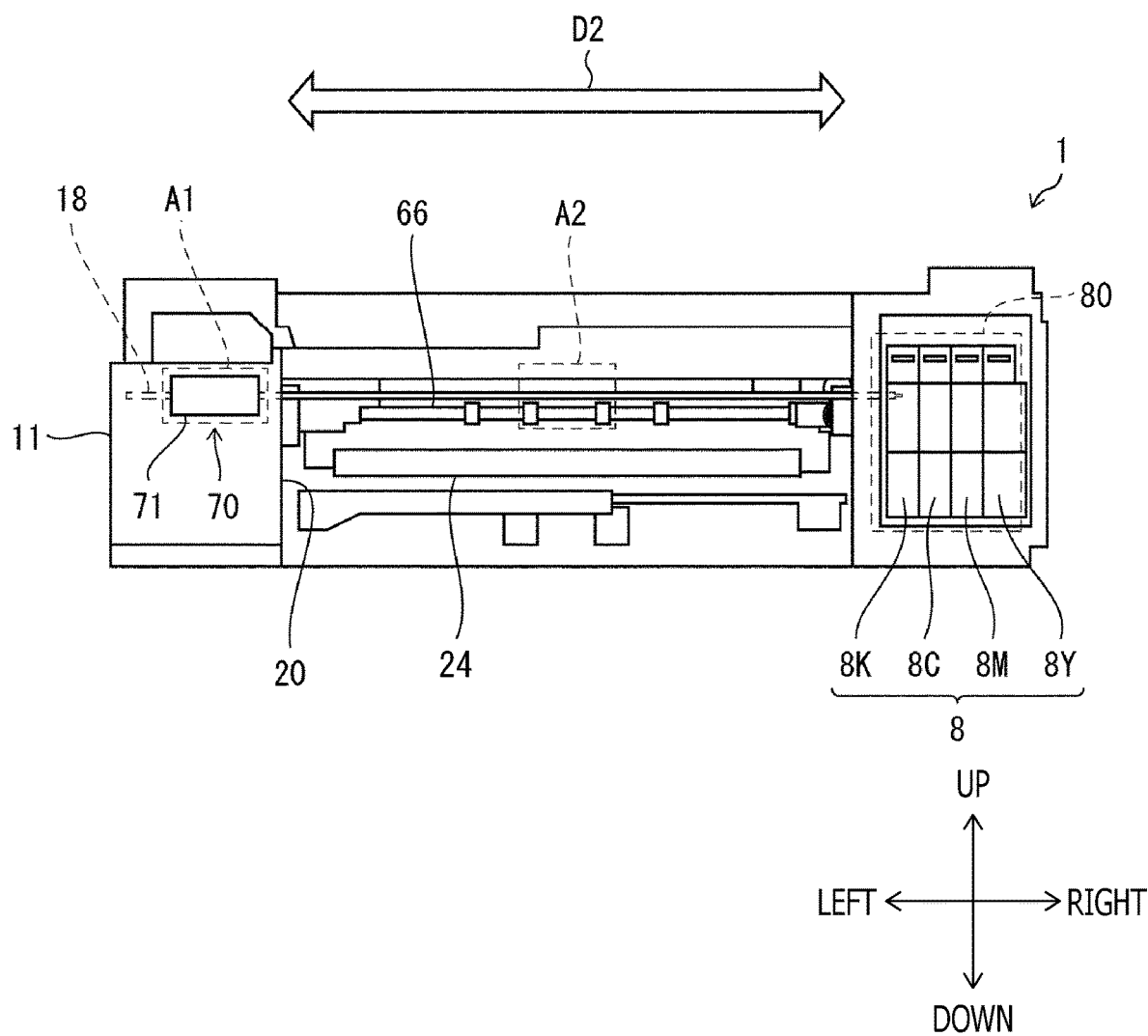
FIG. 4 is a front view showing a standby position and a replacement position for a processing device of the printing apparatus.
Figure 5:
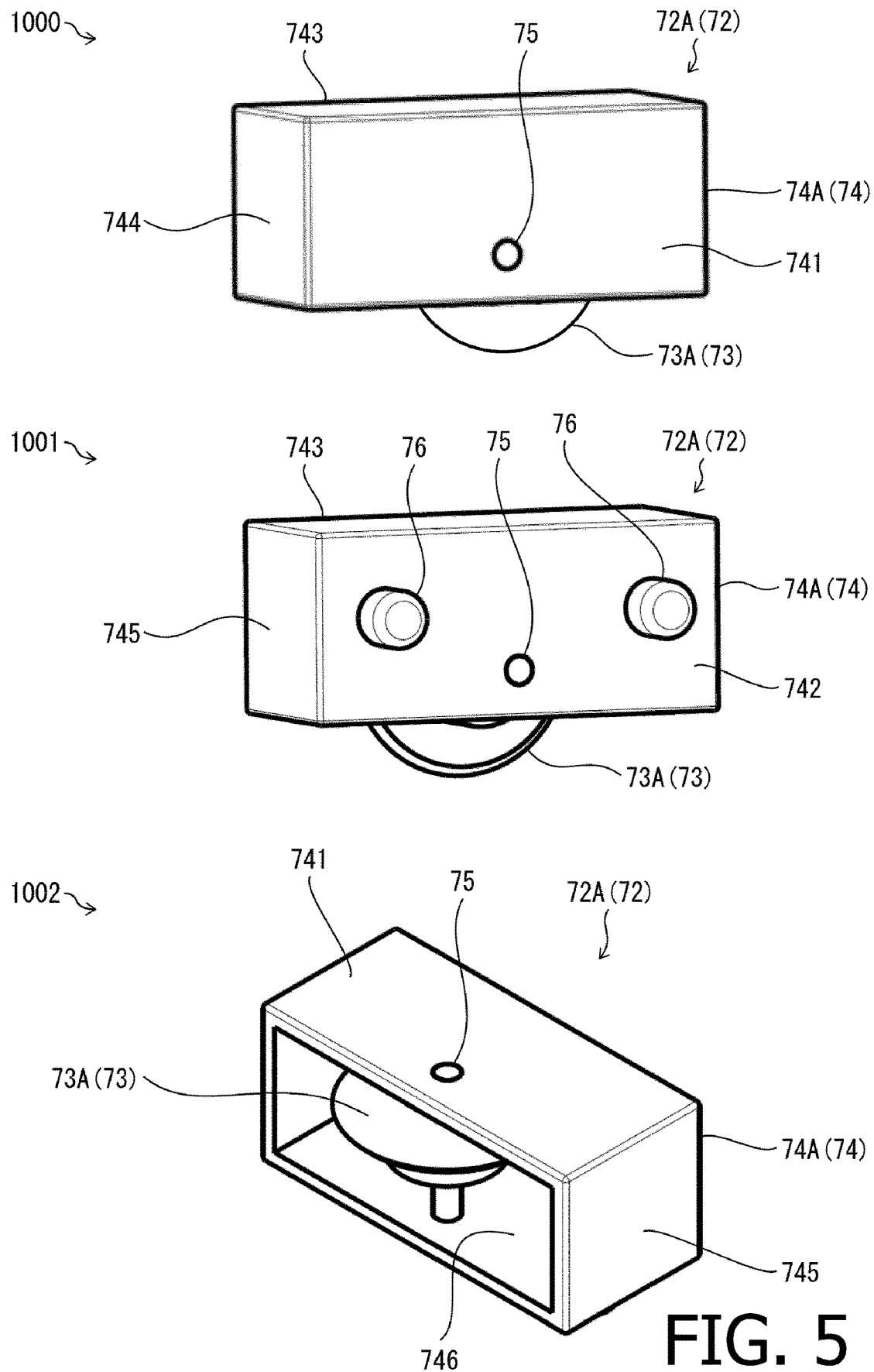
FIG. 5 shows a configuration of a processing unit to be removably attached to the processing device.
Figure 6:
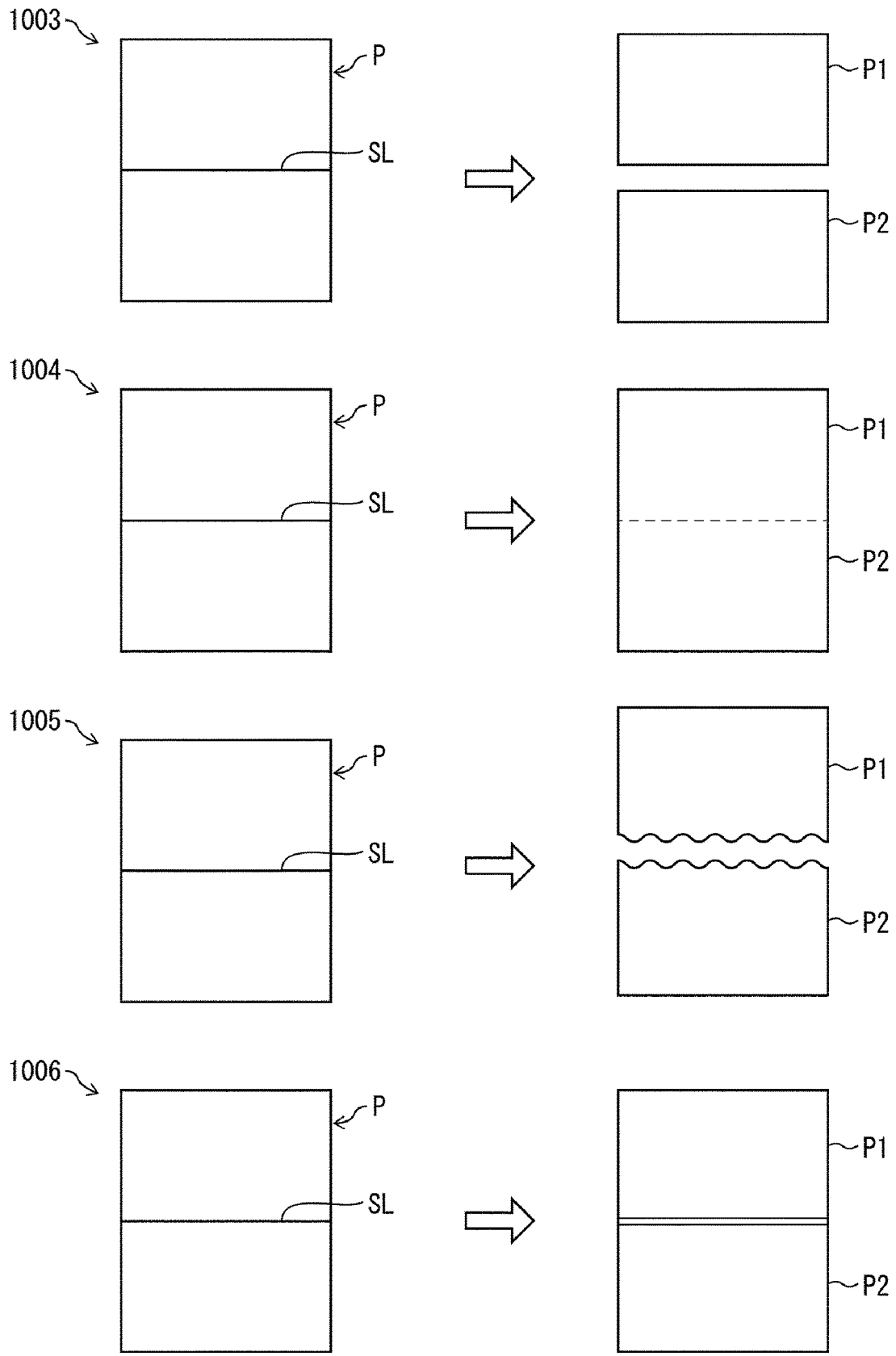
FIG. 6 shows examples of processing processes executable by the processing device.

A configuration of the processing device 70 of the printing apparatus 1 of the first illustrative embodiment will be described with reference to FIGS. 4 to 6. FIG. 4 is a front view showing a standby position A1 and a replacement position A2 for the processing device 70 of the printing apparatus 1 in the first illustrative embodiment. FIG. 5 shows a configuration of a processing unit 72 of the processing device 70 in the first illustrative embodiment. FIG. 6 shows example types of processing processes executable by the processing device 70 in the first illustrative embodiment.

The processing device 70 has a unit carriage 71 (see FIG. 4) and the processing unit 72 (see FIG. 5). The processing unit 72 is removably attached to the unit carriage 71. As shown in FIG. 4, the processing device 70 is movable along a support rail 18 extending along a second direction (hereinafter, which may be referred to as a "processing direction D2"). The second direction is orthogonal to the conveyance direction D1. Namely, the processing device 70 is configured to reciprocate along the width direction of the sheet P. In other words, the processing device 70 is movable along the left-to-right direction of the printing apparatus 1. It is noted that the second direction may not necessarily be a direction orthogonal to the conveyance direction D1, but has only to be a direction intersecting the conveyance direction D1. In the first illustrative embodiment, the first direction of the head carriage 31 is the same direction as the second direction of the unit carriage 71. The second direction may be different from the first direction.

The support rail 18 is provided with an endless belt wound around a rotational shaft (not shown). The endless belt is connected with the unit carriage 71. The rotational shaft is rotated by a driving force from the unit carriage motor 110, thereby rotating the endless belt. As the endless belt rotates, the unit carriage 71 reciprocates in the processing direction D2 along the support rail 18.

In the processing direction D2, the standby position A1 for the processing device 70 to be kept on standby is provided opposite the ink cartridges 8. The standby position A1 is a space for keeping the processing device 70 on standby when the processing device 70 is in a standby state where the processing device 70 is not cutting the sheet P. The standby position A1 is located outside the platen 33 in the processing direction D2. The standby position A1 is located outside the opening 20 in the processing direction D2.

The replacement position A2 where the processing unit 72 is replaced is provided between the standby position A1 and the ink cartridges 8 in the processing direction D2. The replacement position A2 is located at a center portion of the opening 20 in the processing direction D2. In the first illustrative embodiment, the replacement position A2 is also a position (hereinafter referred to as a "checking position") where the user is allowed to check an after-mentioned identification color. It is noted that each portion or section with the corresponding identification color applied thereto may be referred to as an "identification-colored section," and may be an example of an "identification section" according to aspects of the present disclosure. The user is allowed to visually recognize the processing unit 72 located at the replacement position A2 through the opening 20. The checking position may be different from the replacement position A2.

A configuration of the processing unit 72 will be described with reference to FIG. 5. FIG. 5 shows appearances of the processing unit 72 of the processing device 70. Here, prior to describing the configuration of the processing unit 72 in detail, on the basis of a state where the processing unit 72 is attached to the unit carriage 71, a front side, a rear side, a lower side, and an upper side of the processing unit 72 are defined as follows. The front side is defined as a side, opposed and closest to the opening 20, of the processing unit 72 attached to the unit carriage 71. The rear side is defined as a side, opposed and closest to the print engine 3, of the processing unit 72 attached to the unit carriage 71. The lower side is defined as a side, opposed and closest to the feed tray 21, of the processing unit 72 attached to the unit carriage 71. The upper side is defined as a side, opposite to the above-defined lower side, of the processing unit 72 attached to the unit carriage 71. The same definitions of the front, rear, lower, and upper sides of the processing unit 72 may apply to FIGS. 9, 14, and 16. A reference numeral 1000 indicates a perspective view of the processing unit 72 when viewed from the front side. A reference numeral 1001 indicates a perspective view of the processing unit 72 when viewed from the rear side. A reference numeral 1002 indicates a perspective view of the processing unit 72 when viewed from the lower side.

As shown in FIG. 5, the processing unit 72 has a processing blade 73 and a unit housing 74. The processing blade 73 is a blade for the processing process. The configuration of the processing blade 73 varies depending on the type of the processing process. Namely, the type of the processing process executable by the processing device 70 is determined by the type of the processing blade 73 of the processing unit 72. The user attaches, to the unit cartridge 71, the processing unit 72 with the processing blade 73 for an intended processing process.

With reference to FIG. 6, examples of the types of the processing processes executable by the processing device 70 will be shown below. The reference numeral 1003 in FIG. 6 indicates an example of a processing process (hereinafter referred to as a "cutting process") to cut the sheet P in a dividing position SL of the sheet P. The reference numeral 1004 in FIG. 6 indicates an example of a processing process (hereinafter referred to as a "perforating process") to form perforations in the dividing position SL. The reference numeral 1005 in FIG. 6 indicates an example of a processing process (hereinafter referred to as a "wavy line cutting process") to cut the sheet P in a wavy line shape in the dividing position SL. The reference numeral 1006 in FIG. 6 indicates an example of a processing process (hereinafter referred to as a "creasing process") to form a crease in the division position SL. The sheet P may be divided into the first sheet P1 and the second sheet P2 by any of the aforementioned processing processes.

Hereinafter, when an explanation of the processing unit 72 is given without regard to the type of the processing process, each element related to the processing unit 72 may be described without any alphabetical characters added to the reference numeral therefor. Specifically, for instance, when explanations of the processing unit 72, the processing blade 73, and the unit housing 74 are given without regard to the type of the processing process, the processing unit 72, the processing blade 73, and the unit housing 74 may be described without any alphabetical characters added to the reference numerals 72, 73, and 74 therefor. On the other hand, when an explanation of the processing unit 72 is given in association with the type of the processing process, each element related to the processing unit 72 is described with a corresponding alphabetical character added to the reference numeral therefor. Specifically, when an explanation of the processing unit 72 is given in association with the cutting process, each element related to the processing unit 72 is described with "A" added to the reference numeral therefor, for instance, like the "processing unit 72A." Additionally, when an explanation of the processing unit 72 is given in association with the perforating process, each element related to the processing unit 72 is described with "B" added to the reference numeral therefor, for instance, like the "processing unit 72B." Further, when an explanation of the processing unit 72 is given in association with the wavy line cutting process, each element related to the processing unit 72 is described with "C" added to the reference numeral therefor, for instance, like the "processing unit 72C." Moreover, when an explanation of the processing unit 72 is given in association with the creasing process, each element related to the processing unit 72 is described with "D" added to the reference numeral therefor, for instance, like the "processing unit 72D." The processing unit 72A shown in FIG. 5 has a processing blade 73A for the cutting process attached thereto. The processing blade 73A is a circular blade.

As shown in FIG. 5, the unit housing 74 is substantially a rectangular housing. However, the shape of the unit housing 74 is not limited to this. A front surface 741 of the unit housing 74, indicated by the reference numeral 1000 in FIG. 5, is a frontward-facing surface. In the first illustrative embodiment, a side surface 744 of the unit housing 74 is a surface facing in a return direction of both the outward and return directions along the processing direction D2. An upper surface 743 of the unit housing 74 is a surface facing toward the upper side of the printing apparatus 1, i.e., an opposite side of the feed tray 21 side. A rear surface 742 of the unit housing 74, indicated by the reference numeral 1001 in FIG. 5, is a rearward-facing surface. A side surface 745 of the unit housing 74 is a surface facing in an outward one of the (outward and return) directions along the processing direction D2.

The rear surface 742 is provided with an attaching section 76. When the attaching section 76 is attached to an attached section (not shown) of the unit carriage 71, the processing unit 72 is attached to the unit carriage 71. When the attaching section 76 is detached from the attached section, the processing unit 72 is removed from the unit carriage 71. In the example shown in FIG. 5, the attaching section 76 is a cylindrical convex section. The attached section of the unit carriage 71 is an opening into which the convex section fits. Examples of the method for attaching the processing unit 72 to the unit carriage 71 are not limited this, but may include a method in which the processing unit 72 is attached to the unit carriage 71 by a fixture such as a screw.

As indicated by the reference numeral 1002 in FIG. 5, the unit carriage 74 has an internal space in which the processing blade 73 is disposed. The processing blade 73 is supported by the unit housing 74 via a support shaft 75. The processing blade 73 is configured to rotate around the support shaft 75. A lower side of the unit housing 74 is open. A part of the processing blade 73 is exposed to the outside of the unit housing 74 from the lower side of the unit housing 74.

The unit housing 74 is provided with a color (hereinafter, which may be referred to as an "identification color") for identifying the type of the processing process executable by the processing unit 72. By visually recognizing the identification color applied to the processing unit 72, the user is allowed to identify the type of the processing process executable by the processing unit. The identification color is applied entirely to the unit housing 74.

The identification color may not necessarily be applied entirely to the unit housing 74, but may be applied partially thereto. In the first illustrative embodiment, the identification color needs only to be applied to at least the front surface 741 and the upper surface 743 of the unit housing 74. When the identification color is applied to the front surface 741, the user is allowed to visually recognize the identification color of the unit housing 74 of the processing unit 72 attached to the unit carriage 71 in the replacement position A2, through the opening 20. In addition, when the identification color is applied to the upper surface 743, the user is allowed to visually recognize the identification color of the unit housing 74 of the processing unit 72 stored in an after-mentioned storage section 90. Namely, in a situation where the user attempts to check the type of the processing process, the identification color needs only to be applied to portions which it is easy for the user to visually recognize.

The identification color applied to the unit housing 74 varies depending on the type of the processing process. To the unit housing 74A, an identification color indicating that the type of the processing process executable by the processing unit 72 is the cutting process is applied. For instance, an identification color "white" is applied to the unit housing 74A. Although FIG. 5 does not show the features as below, the following explanation will be given under an assumption that "yellow" is applied to the unit housing 74B of the processing unit 72B for the perforating process, that "light blue" is applied to the unit housing 74C of the processing unit 72C for the wavy line processing process, and that "orange" is applied to the unit housing 74D of the processing unit 72D for the creasing process.

Although there is no specified limitation on the hue of the identification color applied to the unit housing 74, it is preferred that the hue of the identification color applied to the unit housing 74 be different from the hues of the ink (e.g., with ink colors of cyan, magenta, yellow, and black) stored in the ink cartridges 8. Thereby, it is possible to prevent the user from confusing the unit housing 74 with the ink cartridges 8. The brightness of the identification color applied to the unit housing 74 is desired to be high. Thereby, it is possible to make it easier for the user to check the identification color applied to the unit housing 74 disposed inside the printing apparatus 1. The identification color applied to the unit housing 74 may be a fluorescent color, or a metallic color that reflects light.

[Configuration of Storage Section]

Figure 7:
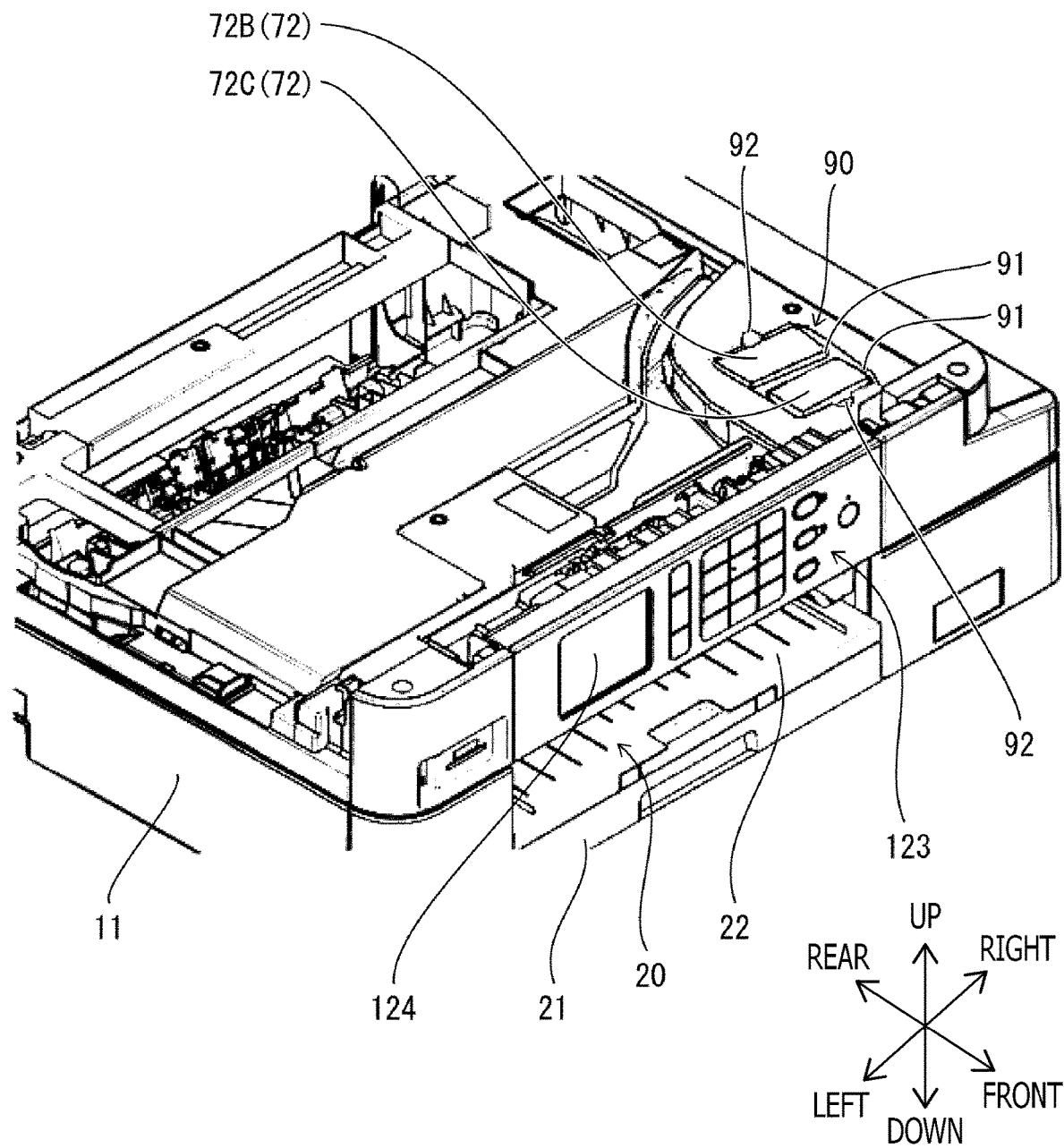
FIG. 7 is a perspective view showing an external appearance of a storage section of the printing apparatus.

Referring to FIG. 7, a configuration of the storage section 90 that stores the processing unit 72 will be described. FIG. 7 is a perspective view showing an appearance of the storage section 90 of the printing apparatus 1.

As shown in FIG. 7, the printing apparatus 1 includes the storage section 90 configured to store the processing units 72 that are not attached to the processing device 70. The storage section 90 is disposed on the main body housing 11. More specifically, the storage section 90 is disposed on an upper face of the main body housing 11 in the vertical direction of the printing apparatus 1. The storage section 90 has a recess 91 for individually storing each processing unit 72. Namely, the storage section 90 has a plurality of recesses 91 formed in the upper face of the main body housing 11. In the example shown in FIG. 7, the processing unit 72B and the processing unit 72C are stored in their corresponding recesses 91, respectively. However, example configurations of the recess(es) 91 are not limited to the example shown in FIG. 7, but may include a single recess 91 configured to store a plurality of processing units 72.

Each processing unit 72 is stored in the corresponding recess 91 in a posture in which the user is allowed to visually recognize the identification color applied to the unit housing 74. Namely, the storage section 90 is configured to store each processing unit 72 in such a manner that the user is allowed to visually recognize the identification color of the processing unit 72. A part of the unit housing 74 of each processing unit 72 stored in the corresponding recess 91 is exposed to the outside of the recess 91. More specifically, the upper surface 743 of the unit housing 74 is exposed to the outside of the recess 91. Thereby, the user is allowed to visually recognize the identification color applied to the unit housing 74 and recognize the type of the processing process executable by each processing unit 72.

A part of the unit housing 74 of each processing unit 72 stored in the corresponding recess 91 protrudes upward from the recess 91. A groove 92 is formed around each recess 91. The formation of the groove 92 make it easier for the user to grasp the processing unit 72 when the user attempts to remove the processing unit 72 from the recess 91.

[Configuration of Display Screens]

Figure 8:
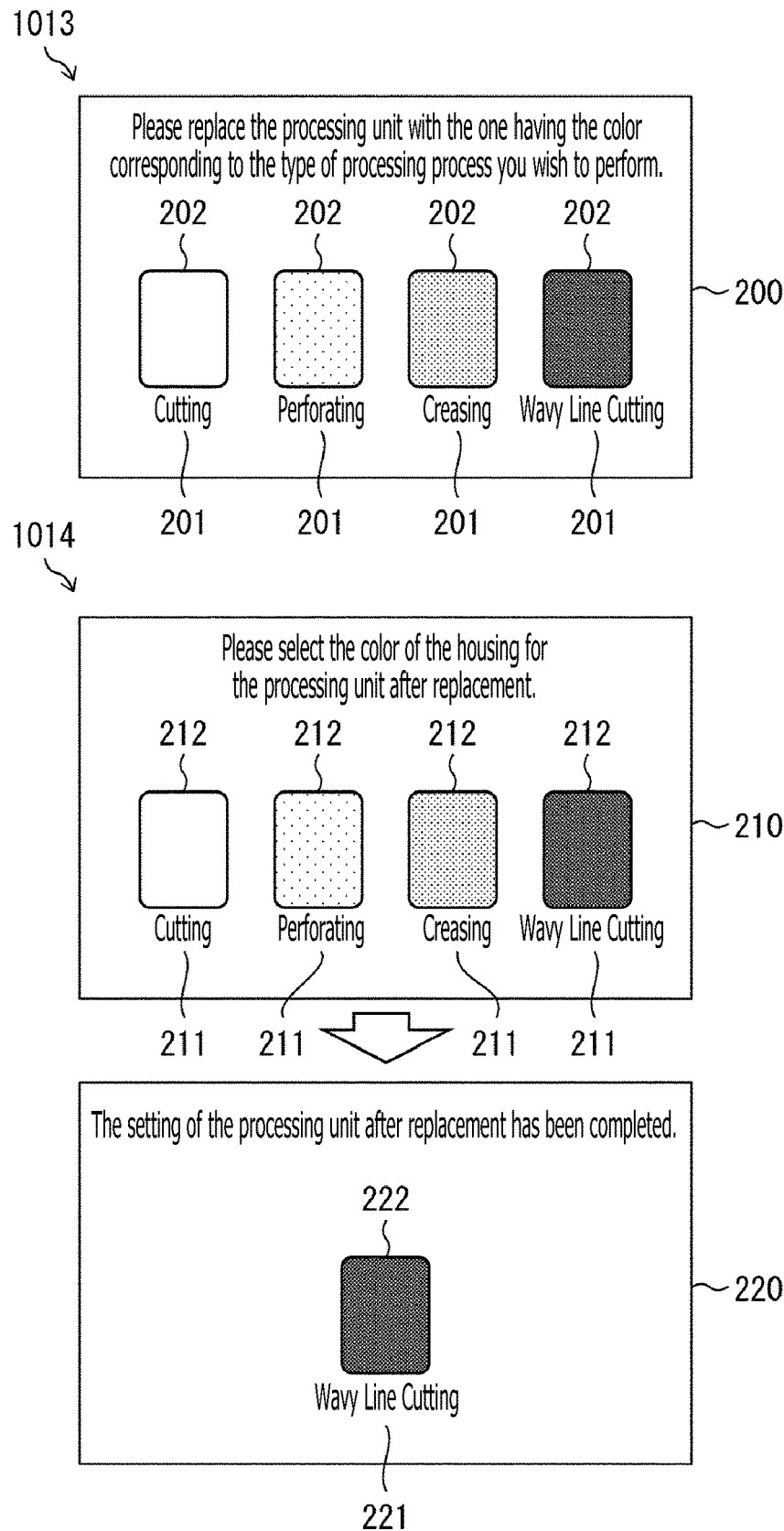
FIG. 8 shows examples of screens displayed on a display of the printing apparatus.

Referring to FIG. 8, display screens to be displayed on the display 124 will be described. FIG. 8 shows examples of the display screens displayed on the display 124 of the printing apparatus 1. The reference numeral 1013 in FIG. 8 indicates an example of a notification screen 200 displayed on the display 124. The reference numeral 1014 in FIG. 8 indicates an example of the display screen on the display 124 making a transition from a selection screen 210 to a setting completion screen 220.

The notification screen 200 indicated by the reference numeral 1013 in FIG. 8 will be described. The notification screen 200 is a display screen for informing the user that the processing unit 72 needs to be replaced. Namely, the notification screen 200 is displayed on the display 124 before the user replaces the processing unit 72 attached to the unit carriage 71.

In the example indicated by the reference numeral 1013 in FIG. 8, the notification screen 200 displays thereon a plurality of types of processing processes executable by the printing apparatus 1. Specifically, the notification screen 200 displays a name 201 indicating each type of processing process, and an identification color corresponding to each type of processing process. In more detail, a mark 202 with a corresponding identification color applied thereto is displayed above each of the names 201 on the notification screen 200. A "white" mark 202 is displayed above the name 201 indicating the cutting process. A "yellow" mark 202 is displayed above the name 201 indicating the perforating processing. An "orange" mark 202 is displayed above the name 201 indicating the creasing process. A "light blue" mark 202 is displayed above the name 201 indicating the wavy line cutting process. It is noted that only the name 201 and the mark 202 for the type of the processing process executable by a processing unit 72 to be replaced may be displayed on the notification screen 200.

Next, the selection screen 210 indicated by the reference numeral 1014 in FIG. 8 will be described. The selection screen 210 is a display screen configured to display thereon a plurality of types of processing processes and accept a user selection from among the plurality of processing processes. The selection screen 210 is displayed on the display 124 after the user has replaced the processing unit 72 with another processing unit 72. The user may operate the selection screen 210 to select a type of processing process executable by said another processing unit 72 after the replacement.

The selection screen 210 displays thereon the plurality of types of processing processes executable by the printing apparatus 1. Specifically, the selection screen 210 displays a name 211 indicating each type of processing process, and an identification color corresponding to each type of processing process. In more detail, a mark 212 with a corresponding identification color applied thereto is displayed above each of the names 211 on the selection screen 210, in substantially the same manner as on the notification screen 200. The user may select a mark 212 indicating an intended type of processing process from among the plurality of marks 212 displayed on the selection screen 210.

As indicated by the reference numeral 1014 in FIG. 8, when a type of processing process is selected via the selection screen 210, the setting completion screen 220 is displayed on the display 124. The setting completion screen 220 is a display screen for notifying the user that the setting has been completed to set the type of processing process selected via the selection screen as a processing process executable by the processing unit 72 attached to the processing device 70. The setting completion screen 220 displays only a name 221 indicating the type of processing process selected by the user and a mark 222 with a corresponding identifying color applied thereto. In the example indicated by the reference numeral 1014 in FIG. 8, the name 221 indicating the selected wavy line cutting process and the mark 222 with the identification color "light blue" applied thereto are displayed.

[Modifications of Processing Unit]

Figure 9:
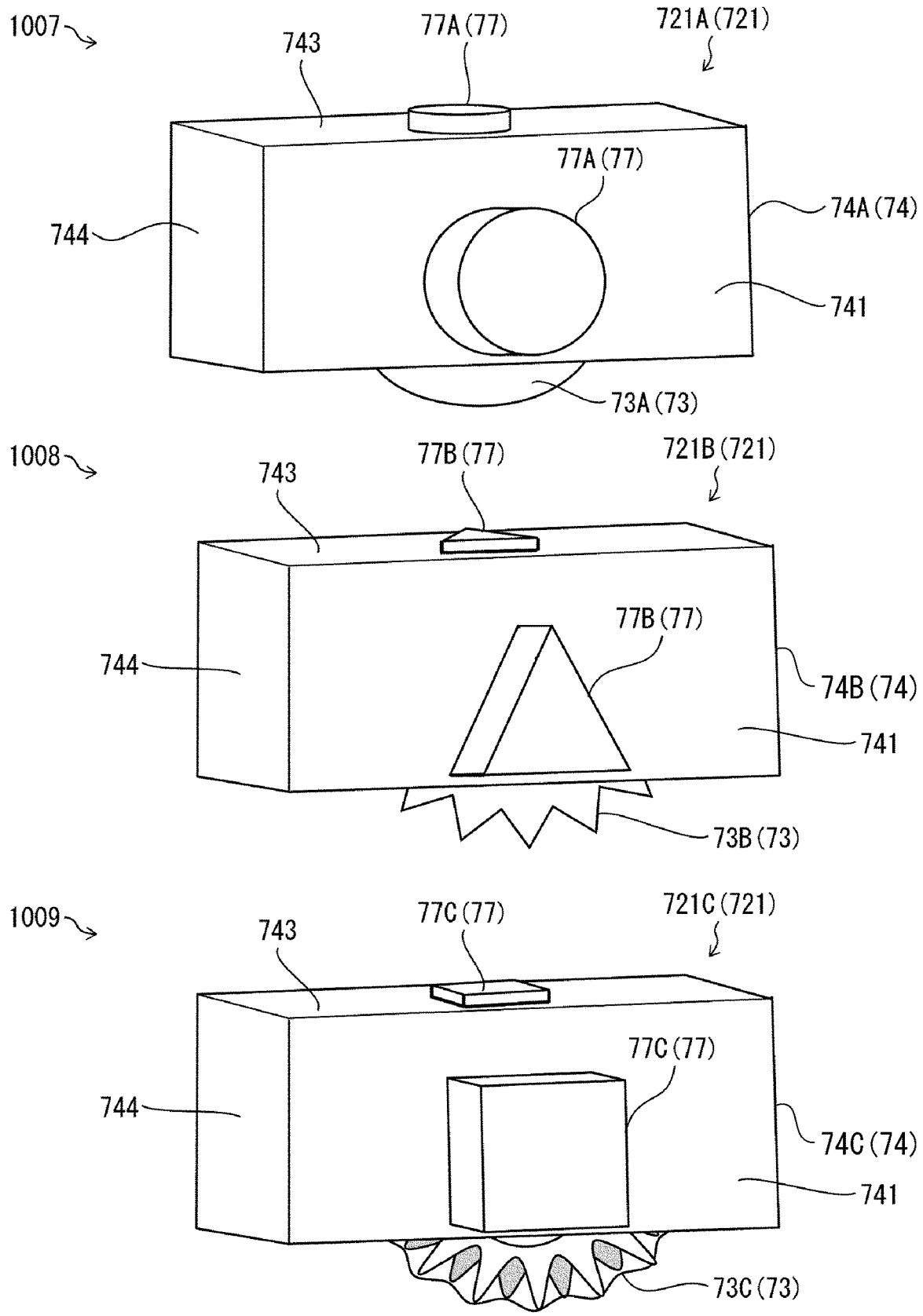
FIG. 9 shows modifications of the processing unit.

With reference to FIG. 9, modifications of the processing unit 72 in the first illustrative embodiment will be described. FIG. 9 shows modifications of the processing unit 72 in the first illustrative embodiment. The reference numeral 1007 in FIG. 9 indicates a processing unit 721A configured to perform the cutting process. The reference numeral 1008 in FIG. 9 indicates a processing unit 721B configured to perform the perforating process. The reference numeral 1009 in FIG. 9 indicates a processing unit 721C configured to perform the wavy line cutting process.

Each processing unit 721 has a section that is formed, in a user-visually-recognizable manner, in an identification shape 77 for identifying a corresponding type of processing process. Each portion or section formed in the corresponding identification shape 77 may be referred to as an "identification-shaped section," and may be an example of the "identification section" according to aspects of the present disclosure. The identification shapes 77 applied to the unit housing 74 are different depending on the types of processing processes. In the present modifications, each identification-shaped section having the corresponding identification shape 77 is formed on the unit housing 74. In the example shown in FIG. 9, an identification shape 77A, which indicates the cutting process, is a columnar shape reminiscent of a "circle." An identification shape 77B, which indicates the perforating process, is a triangular prism shape reminiscent of a "triangle." An identification shape 77C, which indicates the wavy line cutting process, is a quadrangular prism shape reminiscent of a "square."

In the example shown in FIG. 9, each identification-shaped section having the corresponding identification shape 77 is formed on the front surface 741 and the upper surface 743 of the processing unit 721. When each identification shape 77 is applied to the front surface 741, it makes it easy for the user to visually recognize each identification shape 77 in the replacement position A2. When each identification shape 77 is applied to the upper surface 743, it makes it easy for the user to visually recognize each identification shape 77 in a state where the processing unit 721 is stored in the storage section 90. Namely, each identification-shaped section having the corresponding identification shape 77 needs only to be formed on such portion(s) of the unit housing 74 that it is easy for the user to visually recognize the identification shape 77 in a situation where the user attempts to check the type of the processing process.

In the present modifications, each of the marks 202, 212, and 222 displayed, respectively, on the notification screen 200, the selection screen 210, and the setting completion screen 220 may be shown with a design indicating the corresponding identification shape 77.

[Modifications of Storage Section]

Figure 10:
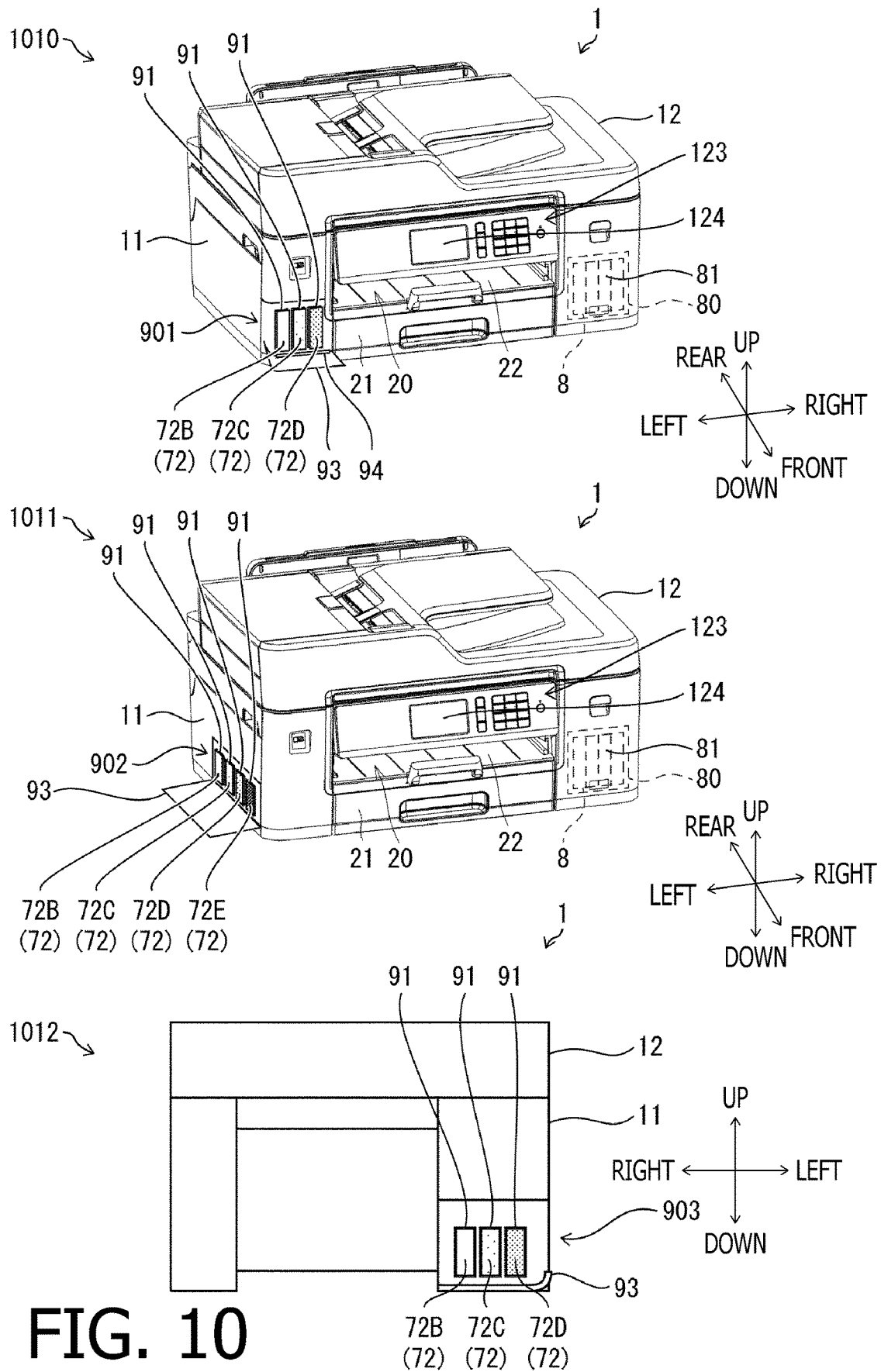
FIG. 10 shows modifications of the storage section of the printing apparatus.

Referring to FIG. 10, modifications of the storage section 90 will be described. FIG. shows modifications of the storage section 90 of the printing apparatus 1.

In the example indicated by the reference numeral 1010 in FIG. 10, a storage section 901 is disposed on the front face of the main body housing 11. Specifically, as indicated by the reference numeral 1010 in FIG. 10, the storage section 901 is disposed on the front face, of the main body housing 11, which is located at a downstream end of the main body housing 11 in the conveyance direction D1. The storage section 901 is disposed on an opposite side of the ink cartridges 8 in the processing direction D2.

The main body housing 11 further includes a processing unit cover 93. The processing unit cover 93 is disposed to be rotatable, relative to the main body housing 11, around a hinge 94 provided to the main body housing 11. The storage section 901 is disposed inside the processing unit cover 93. The storage section 901 has a plurality of recesses 91. In each recess 91, a corresponding one of the processing units 72B, 72C, and 72D is stored.

According to the above configuration, the user is allowed to recognize the storage section 901 when viewing the printing apparatus 1 from the front. Thereby, the user is allowed to easily recognize a position where the storage section 901 is disposed. Moreover, according to the above configuration, it is possible to utilize an empty space on the opposite side, in the processing direction D2, of the location where the ink cartridges 8 are provided. This enables effective use of the empty space in the printing apparatus 1.

In the example indicated by the reference numeral 1011 in FIG. 10, a storage section 902 is disposed on a side face of the main body housing 11. As indicated by the reference numeral 1011 in FIG. 10, the storage section 902 is disposed on an end face of the main body housing 11 in the processing direction D2. According to the above configuration, it is possible to utilize an empty space on a lateral side of the printing apparatus 1. This enables effective use of the empty space in the printing apparatus 1.

The storage section 902 is disposed on an opposite side of the ink cartridges 8 in the processing direction D2. The storage section 902 is disposed inside the processing unit cover 93. The storage section 902 has a plurality of recesses 91. In each recess 91, a corresponding one of the processing units 72B, 72C, 72D, and 72E is stored.

In the example indicated by the reference numeral 1012 in FIG. 10, a storage section 903 is disposed on a rear face of the main body housing 11. As indicated by the reference numeral 1011 in FIG. 10, the storage section 903 is disposed on a rear side, of the main body housing 11, which is located at an upstream end in the conveyance direction D1. According to the above configuration, it is possible to utilize an empty space on the rear side of the printing apparatus 1. This enables effective use of the empty space in the printing apparatus 1.

The storage section 903 is disposed on an opposite side of the ink cartridges 8 in the processing direction D2. The storage section 903 is disposed inside the processing unit cover 93. The storage section 903 has a plurality of recesses 91. In each recess 91, a corresponding one of the processing units 72B, 72C, and 72D is stored.

[Flow of Control by Controller]

Figure 11:
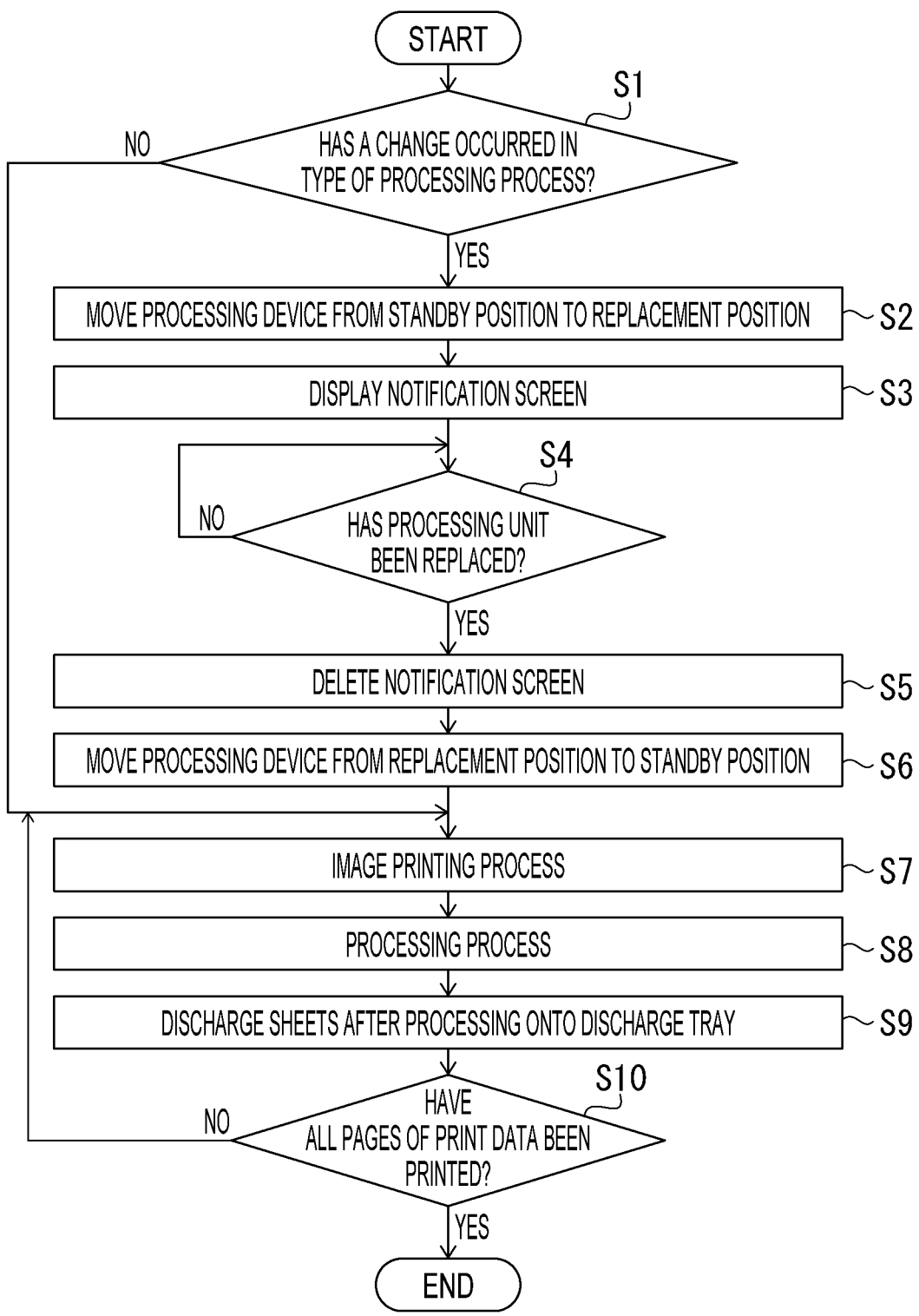
FIG. 11 is a flowchart showing an example procedure of control during a printing process by the printing apparatus.

A flow of control during a printing process by the controller 100 of the printing apparatus 1 in the first illustrative embodiment will be described with reference to FIG. 11. FIG. 11 is a flowchart showing an example procedure of control during a printing process by the printing apparatus 1 of the first illustrative embodiment. The flowchart shown in FIG. 11 is merely an example. The flow of control during the printing process by the printing apparatus 1 is not limited to this.

As shown in FIG. 11, in response to receiving a print job, the controller 100 first determines whether a change has occurred in the type of processing process between the type of processing process specified in the print job and the type of processing process set in the printing apparatus 1 (S1). When no change has occurred in the type of processing process (S1: No), the controller 100 executes an after-mentioned step S7. When a change has occurred in the type of processing process (S1: Yes), the controller 100 drives the unit carriage motor 110 to move the processing device 70 from the standby position A1 to the replacement position A2 (S2).

After S2, the controller 100 causes the display 124 to display the notification screen 200 (S3). Next, the controller 100 determines whether the processing unit 72 of the processing device 70 has been replaced (S4). When the processing unit 72 has not been replaced (S4: No), the controller 100 again makes the determination in S4. When the processing unit 72 has been replaced (S4: Yes), the controller 100 deletes the notification screen 200 from the display 124 (S5).

After S5, the controller 100 drives the unit carriage motor 110 to move the processing device 70 from the replacement position A2 to the standby position A1 (S6). Next, the controller 100 performs an image printing process to print an image on a sheet P (S7). In S7, the controller 100 drives the feed motor 107 to rotate the pick-up roller 24 in a forward rotational direction, thereby picking up a sheet P from the feed tray 21 and feeding the sheet P to the print engine 3. In S7, the controller 100 controls the print engine 3 to perform image printing on the sheet P conveyed to the print engine 3.

After S7, the controller 100 performs a processing process to divide the sheet P into a plurality of sheets (S8). In S8, the controller 100 drives the unit carriage motor 110 to move the processing device 70 in the processing direction D2, and performs processing to divide the sheet P into a plurality of sheets (e.g., into a first sheet P1 and a second sheet P2) in a dividing position SL of the sheet P. After S8, the controller 100 discharges the first sheet P1 and the second sheet P2 into which the sheet P has been divided, onto the discharge tray 22 (S9).

Next, the controller 100 determines whether all pages included in print data of the print job have been printed (S10). When all the pages included in the print data have not been printed (S10: No), the controller 100 goes to and executes S7. When all the pages included in the print data have been printed (S10: Yes), the controller 100 terminates the process shown in FIG. 11.

Figure 12:
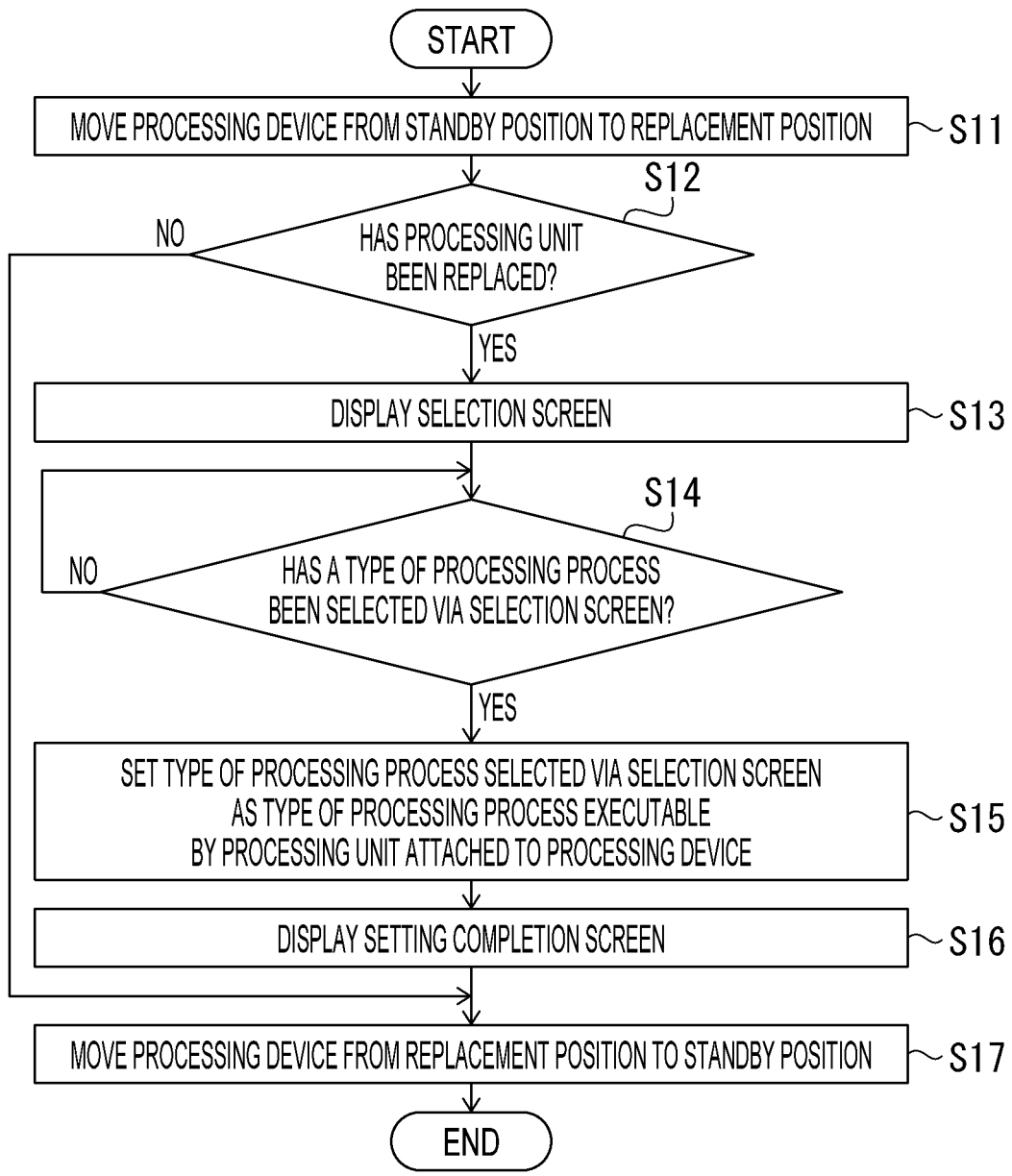
FIG. 12 is a flowchart showing an example procedure of control during a unit checking process by the printing apparatus.

Next, a flow of control during a unit checking process by the controller 100 of the printing apparatus 1 in the first illustrative embodiment will be described with reference to FIG. 12. FIG. 12 is a flowchart showing an example procedure of control during the unit checking process by the printing apparatus 1 in the first illustrative embodiment. The unit checking process is a process for the user to check the identification color applied to the processing unit 72 of the processing device 70. The unit checking process is performed, for instance, in response to an operation to the setting I/F 123. The flowchart shown in FIG. 12 is merely an example. The flow of control during the unit checking process is not limited to this.

First, in response to receiving a job to check the type of the processing unit 72 attached to the processing device 70, the controller 100 moves the processing device 70 from the standby position A1 to the replacement position A2 (S11). Next, the controller 100 determines whether the processing unit 72 has been replaced (S12). When the processing unit 72 has not been replaced (S12: No), the controller 100 proceeds to and executes an after-mentioned step S17. When the processing unit 72 has been replaced (S12: Yes), the controller 100 causes the display 124 to display the selection screen 210 (S13).

Next, the controller 100 determines whether a type of processing process has been selected by the user via the selection screen 210 (S14). When any type of processing process has not been selected (S14: No), the controller 100 again makes the determination in S14. When a type of processing process has been selected (S14: Yes), the controller 100 sets the type of the processing process executable by the processing unit 72 attached to the unit carriage 71 to the type of processing process selected via the selection screen 210 (S15). Namely, in S15, the type of processing process selected via the selection screen 210 is set as the type of the processing process executable by the processing device 70. After S15, the controller 100 causes the display 124 to display the setting completion screen 220 (S16). Next, the controller 100 moves the processing device 70 from the replacement position A2 to the standby position A1 (S17). After S17, the controller 100 terminates the process shown in FIG. 12.

[Modification of Flow of Control During Printing Process]

Figure 13:
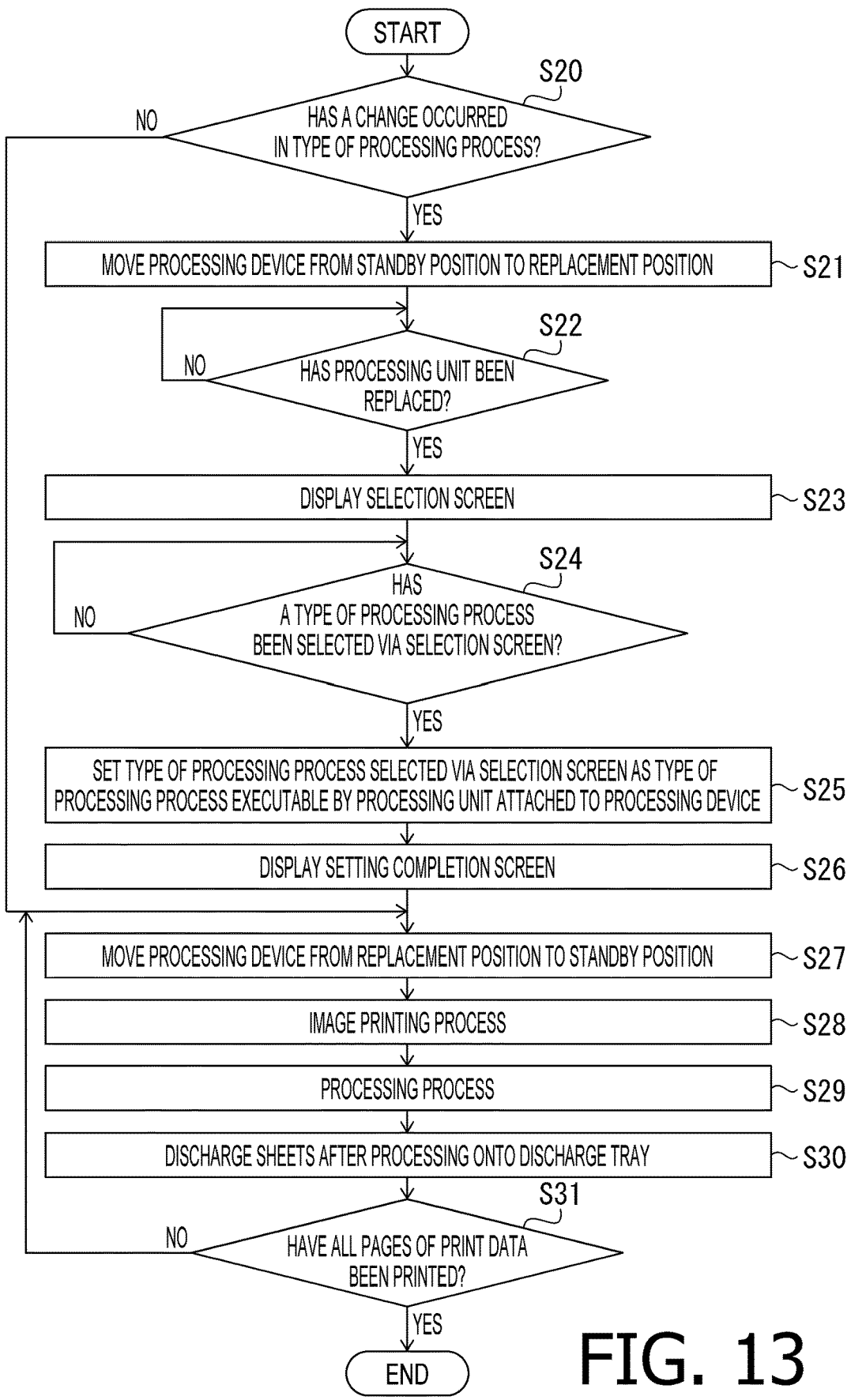
FIG. 13 is a flowchart showing a modification of the procedure of control during the printing process by the printing apparatus.

Next, a modification of the flow of control during the printing process by the controller 100 of the printing apparatus 1 in the first illustrative embodiment will be described with reference to FIG. 13. FIG. 13 is a flowchart showing a modification of the procedure of control during the printing process by the printing apparatus 1 in the first illustrative embodiment. The flowchart shown in FIG. 13 is merely an example. The flow of control during the printing process by the printing apparatus 1 is not limited to this.

Since the steps S20 and S21 shown in FIG. 13 correspond to the steps S1 and S2 in FIG. 11, respectively, explanations thereof are omitted. After S21, the controller 100 determines whether the processing unit 72 has been replaced (S22). Namely, unlike the flowchart shown in FIG. 11, the controller 100 does not display the notification screen 200 on the display 124. When the processing unit 72 has not been replaced (S22: No), the controller 100 again makes the determination in S22. When the processing unit 72 has been replaced (S22: Yes), the controller 100 causes the display 124 to display the selection screen 210 (S23). Namely, unlike the flowchart shown in FIG. 11, the controller 100 displays the selection screen 210 on the display 124 after replacement of the processing unit 72.

Next, the controller 100 determines whether a type of processing process has been selected by the user via the selection screen 210 (S24). When any type of processing process has not been selected (S24: No), the controller 100 again makes the determination in S24. When a type of processing process has been selected (S24: Yes), the controller 100 sets the type of the processing process executable by the processing unit 72 attached to the unit carriage 71 to the type of processing process selected via the selection screen 210 (S25).

After S25, the controller 100 causes the display 124 to display the setting completion screen 220 (S26). Since the individual steps of S26 to S31 shown in FIG. 13 correspond to the steps S6 to S10 shown in FIG. 11, respectively, explanations thereof are omitted.

Operations and Advantageous Effects of First Illustrative Embodiment

According to the above configuration, each of the processing units 72 and 721 has the identification section (e.g., the identification-colored section or the identification-shaped section). Therefore, the user is allowed to recognize the type of the processing process executable by each of the processing units 72 and 721 through visual recognition of the identification section. As a result, the user is allowed to easily identify the type of the processing process executable by each of the processing units 72 and 721.

According to the above configuration, the printing apparatus 1 includes the storage section 90. Therefore, the processing units 72, 721 that are not attached to the processing device 70 may be stored in the storage section 90. This allows the user to easily replace the processing unit 72 or 721 currently attached to the processing device 70 with an intended one of the processing units 72, 721 stored in the storage section 90.

According to the above configuration, the storage section 90 is formed on the upper face of the main body housing 11. Therefore, the user is allowed to check the position of the storage section 90 from above the main body housing 11. This allows the user to easily check the location of the storage section 90.

According to the above configuration, the processing unit in the standby position A1, in which it is difficult for the user to check the type of the processing process executable by the processing unit, is moved to a checking position (e.g., the replacement position A2) where the user is allowed to check the type of the processing process executable by the processing unit. This allows the user to check the processing unit 72 or 721 attached to the processing device 70.

By setting the replacement position A2 as the checking position, it is not necessary to move the processing device 70 in the confirmation position to the replacement position A2. Thereby, it is possible to reduce a work time required when the processing unit 72 or 721 is replaced.

According to the above configuration, the notification screen 200 is displayed on the display 124. Thereby, the user is allowed to recognize that the processing unit 72 or 721 needs to be replaced.

Moreover, the identification section (with, e.g., the identification color or the identification shape 77) corresponding to each type of processing process is shown on the notification screen 200. Therefore, the user is allowed to check, via the notification screen 200, the identification section provided to the processing unit 72 or 721 to be replaced. Thereby, the user is allowed to easily recognize an intended processing unit 72 or 721.

According to the above configuration, on the selection screen 210 displayed on the display 124, a plurality of types of processing processes executable by the printing apparatus 1 are displayed. Thereby, the user is allowed to select one of the plurality of types of processing processes displayed on the selection screen 210.

According to the above configuration, the selection screen 210 displays the identification section (with, e.g., the identification color or the identification shape 77) corresponding to each type of processing process. Therefore, the user is allowed to check, via the selection screen 210, the identification section provided to the processing unit 72 or 721 after the replacement. Thereby, the user is allowed to easily select the type of the processing process executable by the processing unit 72 or 721 after the replacement.

According to the above configuration, the user needs to operate the selection screen 210 after the processing unit 72 or 721 has been replaced. Thereby, the user is allowed to check whether the type of the processing process executable by the processing unit 72 or 721 after the replacement corresponds to the user-intended type of processing process.

According to the above configuration, the type of the processing process to be performed is displayed on the setting completion screen 220 displayed on the display 124. Thereby, the user is allowed to easily recognize that the selected type of processing process will be performed.

Second Illustrative Embodiment

A second illustrative embodiment according to aspects of the present disclosure will be described below. For the sake of explanatory convenience, elements having substantially the same functions as those described in the aforementioned first illustrative embodiment will be represented with the same reference characters, and detailed explanations thereof may be omitted. Processing units 722 in the second illustrative embodiment are different from the processing units 72 in the aforementioned first illustrative embodiment in that the type of the processing process executable by each processing unit 722 is determined by the controller 100.

Figure 14:
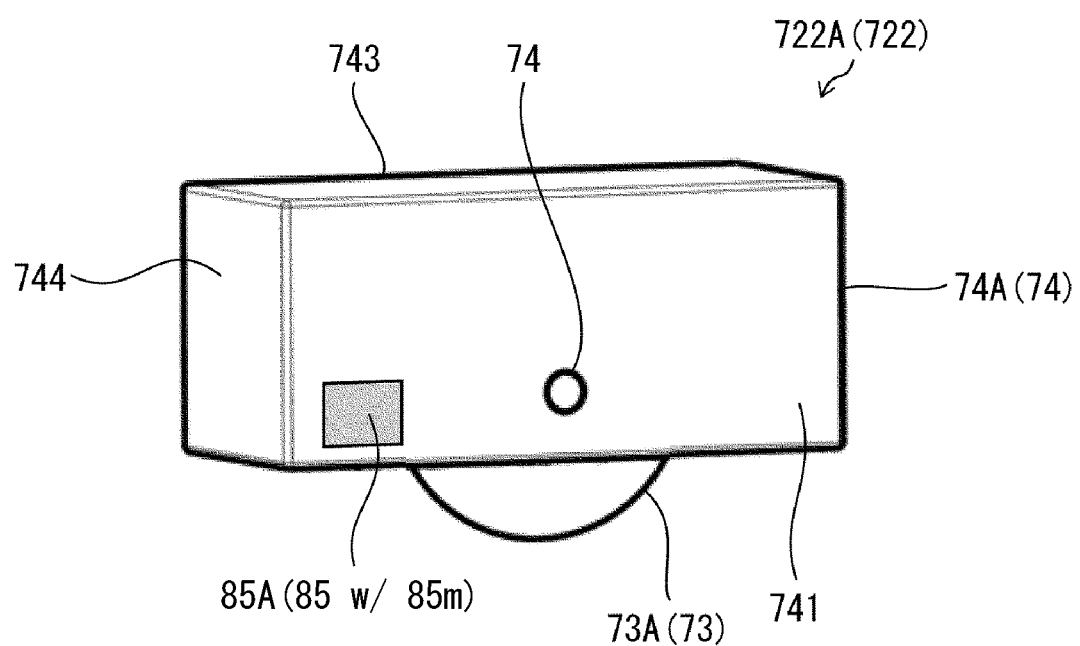
FIG. 14 shows a configuration of a processing unit to be removably attached to the processing device.

The processing units 722 of the second illustrative embodiment will be described with reference to FIG. 14. FIG. 14 shows a configuration of a processing unit 722 of the processing section 70 in the second illustrative embodiment. Each processing unit 722 includes an IC chip 85. The IC chip 85 may be an example of the "identification section" according to aspects of the present disclosure. The IC chip 85 includes a memory device 85m configured to store an identifier indicating the type of the processing process executable by the corresponding processing unit 722. Namely, the IC chips 85 of the processing units 722 store identifiers, which differ depending on the respective types of processing processes indicated by the individual identifiers. The IC chip shown in FIG. 14 stores an identifier indicating the cutting process. Each IC chip 85 is disposed on the front surface 741 of the corresponding unit housing 74. However, the disposition of each IC chip 85 is not limited to this, but each IC chip 85 may be disposed at other portions of the corresponding unit housing 74.

Each IC chip 85 is configured to perform transmission and reception of information in a non-contact manner. The main body housing 11 is provided with a reader (not shown) configured to read information at least from the IC chip 85 of the processing unit 722 attached. The IC chip performs transmission and reception of information with the reader using an electromagnetic wave or an AC magnetic field. The reader transmits the information read from the IC chip to the controller 100.

The controller 100 moves the processing device 70 to a position where the IC chip 85 is enabled to perform transmission and reception of information with the reader, in order to read from the IC chip 85 the identifier indicating the type of the processing process executable by the processing unit 722 attached to the processing device 70. In the second illustrative embodiment, the IC chip 85 performs transmission and reception of information with the reader when the processing device 70 is in the standby position A1. Namely, the standby position A1 is a checking position where the user is allowed to check the IC chip 85 (which may be an example of the "identification section" according to aspects of the present disclosure). The reader is disposed in a position where the reader is enabled to perform transmission and reception of information with the IC chip 85 of the processing unit 722 attached to the processing device 70 located in the standby position A1. It is noted that the checking position may be different from the standby position A1.

The reader reads an identifier from the IC chip 85A of the processing unit 722A attached to the processing device 70 located in the standby position A1 and transmits the read identifier to the controller 100. Based on the identifier transmitted from the reader, the controller 100 determines that the type of the processing process executable by the processing unit 722A of the processing device 70 is the cutting process. If the type of the processing process specified by the print job is different from the type of the processing process executable by the processing unit 722A of the processing device 70, the controller 100 causes the display 124 to display an alert. Thereby, the user is allowed to easily determine the type of the processing process executable by the processing unit 722.

[Flow of Control by Controller]

Figure 15:
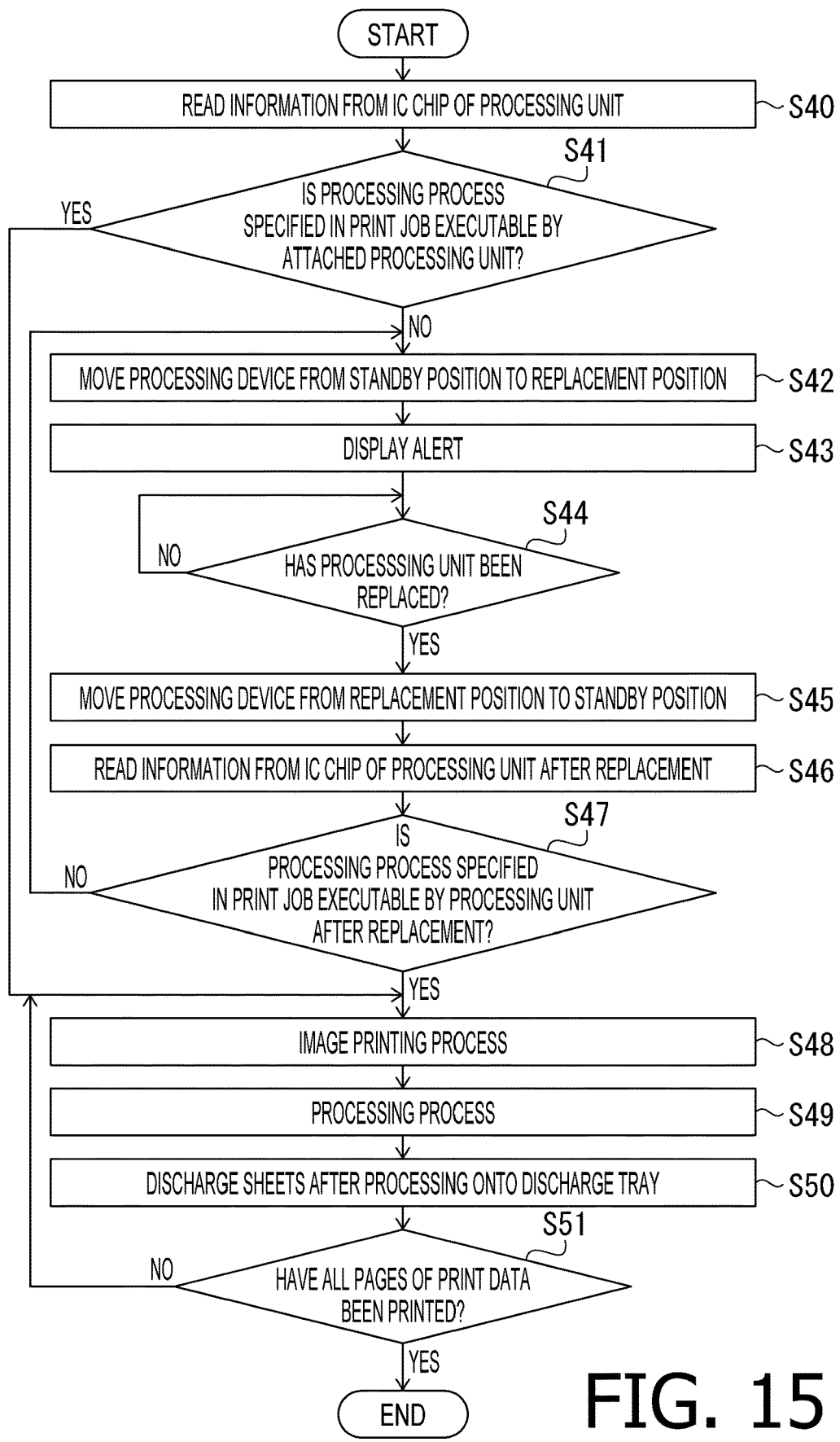
FIG. 15 is a flowchart showing another example procedure of control during the printing process by the printing apparatus.

A flow of control in a case where a printing process is performed by the controller 100 of the printing apparatus 1 in the second illustrative embodiment will be described with reference to FIG. 15. FIG. 15 is a flowchart showing an example procedure of control during the printing process by the printing apparatus 1 in the second illustrative embodiment. The flowchart shown in FIG. 15 is merely an example. The flow of control during the printing process by the printing apparatus 1 is not limited to this.

As shown in FIG. 15, first, in response to receiving a print job, the controller 100 reads information from the IC chip 85 of the processing unit 722 attached to the processing device 70 located at the standby position A1 (S40). Next, the controller 100 determines whether the processing process specified in the print job is executable by the attached processing unit 722 (S41). Specifically, in S41, the controller 100 determines whether the processing process specified in the print job is executable by the attached processing unit 722, by checking whether the type of the processing process stored in the IC chip 85 matches the type of the processing process specified in the print job.

When the processing process specified in the print job is executable by the attached processing unit 722 (S41: Yes), the controller 100 executes an after-mentioned step S48. When the processing process specified in the print job is not executable by the attached processing unit 722 (S41: No), the controller 100 drives the unit carriage motor 110 to move the processing device from the standby position A1 to the replacement A2 (S42). After S42, the controller 100 causes the display 124 to display an alert indicating that the processing process specified in the print job is not executable by the attached processing unit 722 (S43).

Next, the controller 100 determines whether the processing unit 722 has been replaced by the user (S44). When the processing unit 722 has not been replaced (S44: No), the controller 100 again makes the determination in S44. When the processing unit 722 has been replaced (S44: Yes), the controller 100 deletes the alert from the display 124, and drives the unit carriage motor 110 to move the processing device 70 from the replacement position A2 to the standby position A1 (S45). After S46, the controller 100 reads information from the IC chip 85 of the processing unit 722 after the replacement (S46).

Next, the controller 100 determines whether the processing process specified in the print job is executable by the processing unit 722 after the replacement (S47). It is noted that S47 is substantially the same step as S41. When the processing process specified in the print job is not executable by the processing unit 722 after the replacement (S47: No), the controller 100 goes back to and executes S42. When the processing process specified in the print job is executable by the processing unit 722 after the replacement (S47: Yes), the controller 100 proceeds to and executes S48. Since the individual steps S48 to S51 shown in FIG. 15 are substantially the same as the steps S7 to S10 shown in FIG. 11, respectively, detailed explanations thereof are omitted.

[Modifications of Processing Unit]

Figure 16:
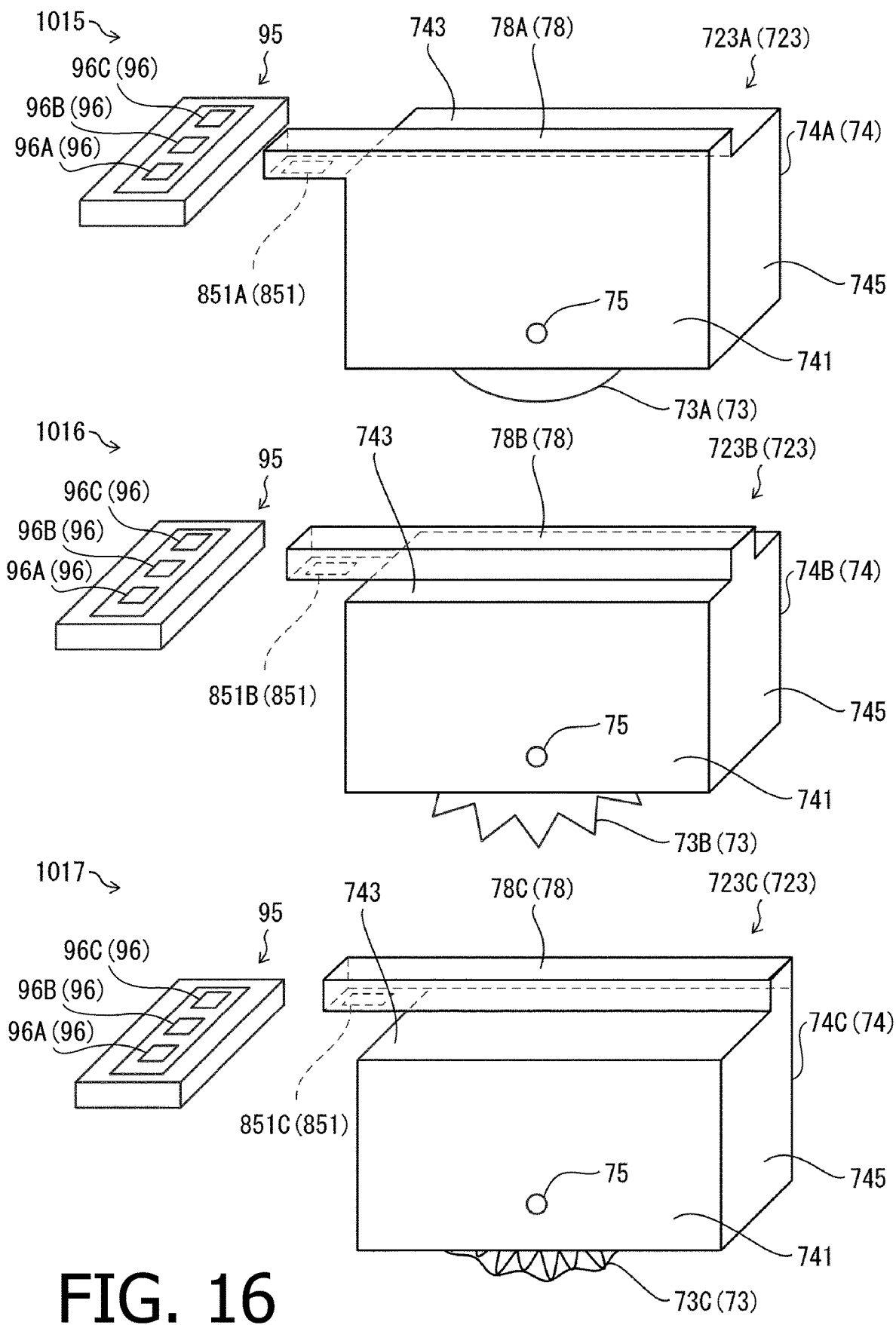
FIG. 16 shows modifications of the processing unit to be removably attached to the processing device.

With reference to FIG. 16, modifications of the processing unit 722 in the second illustrative embodiment will be described. FIG. 16 shows modifications of the processing unit 722 of the processing device 70 in the second illustrative embodiment. The reference numeral 1015 in FIG. 16 indicates a processing unit 723A configured to perform the cutting process. The reference numeral 1016 in FIG. 16 indicates a processing unit 723B configured to perform the perforating processing. The reference numeral 1017 in FIG. 16 indicates a processing unit 723C configured to perform the wavy line cutting process.

As shown in FIG. 16, each processing unit 723 has an arm 78. The arm 78 is disposed on the upper surface 743 of the unit housing 74. The arm 78 protrudes in the return direction along the processing direction D2. More specifically, the arm 78 protrudes in the return direction along the processing direction D2 from the side surface 745 of the unit housing 74. An IC chip 851 is disposed at a portion of the arm 78 that protrudes in the return direction from the side surface 745.

The positions of the arms 78 disposed on the unit housing 74 vary depending on the respective types of the processing processes executable by the individual processing units 723. The arm 78A of the processing unit 723A indicated by the reference numeral 1015 in FIG. 16 is disposed at the front surface 741 side. In other words, the arm 78A is disposed at a front end portion on the upper surface 743 of the unit housing 74. The arm 78B of the processing unit 723B indicated by the reference numeral 1016 in FIG. 16 is disposed in a middle position between the front surface 741 and the rear surface 742. The arm 78C of the processing unit 723C indicated by the reference numeral 1017 in FIG. 16 is disposed at the rear surface 742 side. In other words, the arm 78C is disposed at a rear end portion on the upper surface 743 of the unit housing 74.

Each IC chip 851 is configured to be in contact with a sensor 95 disposed at the main body housing 11. When the processing device 70 is located in the checking position (e.g., the standby position A1), each IC chip 851 is in contact with a corresponding one of contacts 96 of the sensor 95. The sensor 95 is configured to detect an electrical connection between each IC chip 851 and the corresponding contact 96. In response to detecting that an IC chip 851 is electrically connected with a corresponding contact 96, the sensor 95 sends an output signal to the controller 100.

The sensor 95 includes a plurality of contacts 96. A contact 96A is configured to be in contact with the IC chip 851A of the arm 78A. A contact 96B is configured to be in contact with the IC chip 851B of the arm 78B. A contact 96C is configured to be in contact with the IC chip 851C of the arm 78C. The positions of the contacts 96 in contact with the IC chips 851 differs depending on the types of the processing units 723. Namely, the individual processing units 723 have the respective IC chips 851 disposed in specific positions (i.e., sensor-detectable positions where the sensor 95 is enabled to detect the electrical connections between the IC chips 851 and the contacts 96) at the unit housing 74, in such a manner that the sensor-detectable positions where the IC chips 851 are disposed differ depending on the types of the processing units 723. The controller 100 determines the type of processing process based on which of the contact points 96A to 96C each of the IC chips 851A to 851C is in contact with. Specifically, the controller 100 determines that the processing process executable by the processing unit 723A is the cutting process based on the IC chip 851A being in contact with the contact point 96A. The controller 100 determines that the processing process executable by the processing unit 723B is the perforating process based on the IC chip 851B being in contact with the contact point 96B. The controller 100 determines that the processing process executable by the processing unit 723C is the wavy line cutting process based on the IC chip 851C being in contact with the contact point 96C. It is noted that examples of the sensor 95 are not limited to the example described above, but may include a physical sensor configured to detect contact with the processing units 723, and an optical sensor having a light emitting element and a light receiving element.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents.

The following shows examples of associations between elements illustrated in the aforementioned illustrative embodiment(s) and modification(s), and elements claimed according to aspects of the present disclosure. For instance, the printing apparatus 1 may be an example of a "printing apparatus" according to aspects of the present disclosure. The conveyance rollers 60, 62, and 64 may be included in examples of a "conveyor" according to aspects of the present disclosure. The print engine 3 may be an example of a "print engine" according to aspects of the present disclosure. The print head 32 may be an example of a "print head" according to aspects of the present disclosure. The platen 33 may be an example of a "platen" according to aspects of the present disclosure. The processing device 70 may be an example of a "processing device" according to aspects of the present disclosure. The processing units 72 may be included in examples of a "processing unit" according to aspects of the present disclosure. The unit housing 74 with the identification color applied thereto may be included in examples of an "identification section" according to aspects of the present disclosure. In the processing units 721 (see FIG. 9), each section formed in the corresponding identification shape 77 may be included in examples of the "identification section" according to aspects of the present disclosure. The IC chip 85 including the memory device 85m may be included in examples of the "identification section" according to aspects of the present disclosure. The IC chip 851 may be included in examples of the "identification section" according to aspects of the present disclosure. The sensor 95 may be an example of a "sensor" according to aspects of the present disclosure. The main body housing 11 may be an example of a "main body housing" according to aspects of the present disclosure. The storage sections 90, 901, 902, and 903 may be included in examples of a "storage section" according to aspects of the present disclosure. The ink cartridges 8 may be included in examples of a "liquid reservoir" according to aspects of the present disclosure. The controller 100 may be an example of a "controller" according to aspects of the present disclosure. The display 124 may be an example of a "display" according to aspects of the present disclosure. The CPU 101 may be an example of a "processor" according to aspects of the present disclosure.

The ROM 102 may be an example of a "non-transitory computer-readable storage medium" according to aspects of the present disclosure.

What is claimed is:

1. A printing apparatus comprising:
   a conveyor configured to convey a print medium in a conveyance direction;
   a print engine including a print head and a platen configured to support the print medium conveyed by the conveyor, the print engine being configured to perform image printing on the print medium supported by the platen while moving the print head in a first direction intersecting the conveyance direction; and
   a processing device having a processing unit removably attached thereto, the processing device being configured to perform a processing process to divide the print medium conveyed by the conveyor into a plurality of media, the processing unit having an identification section for identifying a type of the processing process executable by the processing unit.

2. The printing apparatus according to claim 1,
   wherein the identification section has a color applied thereto for identifying the type of the processing process executable by the processing unit.

3. The printing apparatus according to claim 2, further comprising a controller and a display,
   wherein the controller is configured to, when a particular condition is satisfied, cause the display to display a notification screen to provide a notification that the processing unit needs to be replaced.

4. The printing apparatus according to claim 3,
   wherein the controller is further configured to cause the display to display the notification screen on which the identification section is associated with the type of the processing process.

5. The printing apparatus according to claim 2, further comprising a controller and a display,
   wherein the controller is configured to, when a particular condition is satisfied, cause the display to display a selection screen to show a plurality of types of the processing process executable by the processing device, the selection screen being configured to accept a selection from among the plurality of types of the processing process.

6. The printing apparatus according to claim 5,
   wherein the controller is further configured to cause the display to display the selection screen on which a plurality of types of the identification section are associated with the plurality of types of the processing process.

7. The printing apparatus according to claim 5,
   wherein the controller is further configured to cause the display to display the selection screen after the processing unit is replaced.

8. The printing apparatus according to claim 5,
   wherein the controller is further configured to cause the display to display a setting completion screen to provide a notification that a setting has been completed to set a type of the processing process selected via the selection screen as a type of the processing process executable by the processing unit attached to the processing device.

9. The printing apparatus according to claim 1,
   wherein the identification section has a shape formed for identifying the type of the processing process executable by the processing unit.

10. The printing apparatus according to claim 9, further comprising a controller and a display,
    wherein the controller is configured to, when a particular condition is satisfied, cause the display to display a notification screen to provide a notification that the processing unit needs to be replaced.

11. The printing apparatus according to claim 10,
    wherein the controller is further configured to cause the display to display the notification screen on which the identification section is associated with the type of the processing process.

12. The printing apparatus according to claim 9, further comprising a controller and a display,
    wherein the controller is configured to, when a particular condition is satisfied, cause the display to display a selection screen to show a plurality of types of the processing process executable by the processing device, the selection screen being configured to accept a selection from among the plurality of types of the processing process.

13. The printing apparatus according to claim 12,
    wherein the controller is further configured to cause the display to display the selection screen on which a plurality of types of the identification section are associated with the plurality of types of the processing process.

14. The printing apparatus according to claim 12,
    wherein the controller is further configured to cause the display to display the selection screen after the processing unit is replaced.

15. The printing apparatus according to claim 12,
    wherein the controller is further configured to cause the display to display a setting completion screen to provide a notification that a setting has been completed to set a type of the processing process selected via the selection screen as a type of the processing process executable by the processing unit attached to the processing device.

16. The printing apparatus according to claim 1,
    wherein the identification section has a memory device storing an identifier for identifying the type of the processing process executable by the processing unit.

17. The printing apparatus according to claim 1, further comprising a sensor disposed outside the processing unit,
    wherein the identification section of the processing unit is disposed in a specific position where the sensor is enabled to detect the identification section, in such a manner that the specific position of the identification section varies depending on a type of the processing process executable by the processing unit.

18. The printing apparatus according to claim 1, further comprising:
    a main body housing; and
    a storage section disposed on the main body housing, the storage section being configured to store the processing unit that is not attached to the processing device.

19. The printing apparatus according to claim 18,
    wherein the storage section is disposed on an upper face of the main body housing in a vertical direction of the printing apparatus.

20. The printing apparatus according to claim 19, further comprising a liquid reservoir configured to store liquid,
    wherein the storage section is disposed opposite to the liquid reservoir in the first direction.

21. The printing apparatus according to claim 18,
    wherein the storage section is disposed on a front face of the main body housing, the front face being a surface located on a downstream side of the printing apparatus in the conveyance direction.

22. The printing apparatus according to claim 18, wherein the storage section is disposed on a rear face of the main body housing, the rear face being a surface located on an upstream side of the printing apparatus in the conveyance direction.

23. The printing apparatus according to claim 18, wherein the storage section is disposed on a side face of the main body housing in the first direction.

24. The printing apparatus according to claim 1, further comprising a controller configured to move the processing device with the processing unit attached, in a second direction interesting the conveyance direction,
wherein the controller is further configured to:
when the processing device is not performing the processing process, cause the processing device to move to and be kept on standby in a standby position, the standby position being located outside the platen in the second direction; and
when a particular condition is satisfied, cause the processing device to move from the standby position to a checking position where the identification section is enabled to be checked.

25. The printing apparatus according to claim 24, wherein the checking position is a replacement position for replacing the processing unit.

26. The printing apparatus according to claim 24, wherein the controller includes:
a processor; and
a non-transitory computer-readable storage medium storing computer-readable instructions that, when executed by the processor, cause the controller to:
when the processing device is not performing the processing process, cause the processing device to move to and be kept on standby in the standby position; and
when the particular condition is satisfied, cause the processing device to move from the standby position to the checking position.

\* \* \* \* \*